(12) United States Patent
Trop et al.

(10) Patent No.: US 11,623,731 B2
(45) Date of Patent: Apr. 11, 2023

(54) AIRCRAFT, AIRCRAFT WINGS AND ASSOCIATED SHEAR TIES

(71) Applicant: The Boeing Company, Chicago, IL (US)

(72) Inventors: David Wesley Trop, Seattle, WA (US); Patrick B. Stickler, Everett, WA (US); William John Koch, IV, Bellevue, WA (US); Benjamin Joseph Palmer, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 78 days.

(21) Appl. No.: 16/995,298

(22) Filed: Aug. 17, 2020

(65) Prior Publication Data
US 2020/0377193 A1 Dec. 3, 2020

Related U.S. Application Data

(63) Continuation of application No. 15/610,598, filed on May 31, 2017, now Pat. No. 10,745,103.

(51) Int. Cl.
*B64C 3/18* (2006.01)
*B64C 3/26* (2006.01)

(52) U.S. Cl.
CPC .............. *B64C 3/182* (2013.01); *B64C 3/187* (2013.01); *B64C 3/26* (2013.01)

(58) Field of Classification Search
CPC ............ B64C 3/182; B64C 3/187; B64C 3/26
See application file for complete search history.

(56) References Cited

U.S. PATENT DOCUMENTS

| | | | | |
|---|---|---|---|---|
| 3,920,206 | A | * 11/1975 | Bigham | B64C 3/26 |
| | | | | 52/489.1 |
| 7,721,995 | B2 | 5/2010 | Tanner et al. | |
| 8,186,622 | B2 | 5/2012 | Munday | |
| 8,479,394 | B2 | 7/2013 | Glazebrook | |
| 10,745,103 | B2 | 8/2020 | Trop et al. | |

(Continued)

FOREIGN PATENT DOCUMENTS

| | | | | |
|---|---|---|---|---|
| EP | 3040268 A1 | * | 7/2016 | ............. B64C 3/182 |
| EP | 3075653 | | 10/2016 | |

(Continued)

OTHER PUBLICATIONS

Canadian Intellectual Property Office, "Examiner's Report," issued in connection with Canadian Patent Application No. 2,995,637, dated Mar. 8, 2021, 6 pages.

(Continued)

*Primary Examiner* — Christopher D Hutchens
(74) *Attorney, Agent, or Firm* — Hanley, Flight & Zimmerman, LLC

(57) ABSTRACT

Aircraft, aircraft wings and associated shear ties are disclosed. An example apparatus includes a first panel coupled to a second panel to define a wing box; a rib disposed chordwise within the wing box; and a stringer disposed spanwise within the wing box immediately adjacent at least one of the first panel or the second panel, the rib including a shear tie including first and second legs extending in opposite directions, the first and second legs to be coupled to at least one of the first panel, the second panel, or the stringer.

20 Claims, 26 Drawing Sheets

(56) References Cited

U.S. PATENT DOCUMENTS

| | | |
|---|---|---|
| 2003/0178458 A1 | 9/2003 | Trambley et al. |
| 2004/0254617 A1 | 12/2004 | Hemmerling et al. |
| 2005/0206613 A1 | 9/2005 | Chan et al. |
| 2006/0226287 A1 | 10/2006 | Grantham et al. |
| 2008/0128554 A1 | 6/2008 | Pham et al. |
| 2008/0173757 A1 | 7/2008 | Tanner et al. |
| 2008/0179461 A1 | 7/2008 | Roming et al. |
| 2008/0210821 A1 | 9/2008 | Tanner et al. |
| 2010/0152619 A1 | 6/2010 | Kalpaxis et al. |
| 2011/0174927 A1 | 7/2011 | Hernandez et al. |
| 2012/0148801 A1 | 6/2012 | Kwon et al. |
| 2014/0353305 A1 | 12/2014 | Matsen et al. |
| 2015/0084860 A1 | 3/2015 | Aleem et al. |
| 2015/0294032 A1 | 10/2015 | Lagally et al. |
| 2015/0298790 A1* | 10/2015 | Vanderhoek ............ B64C 3/26 29/525.01 |
| 2015/0367619 A1 | 12/2015 | Butler |
| 2016/0009365 A1* | 1/2016 | Marks ................ B64C 5/00 244/123.1 |
| 2016/0062320 A1 | 3/2016 | Chung |
| 2016/0091888 A1 | 3/2016 | Doyle et al. |
| 2016/0207607 A1 | 7/2016 | Charles et al. |
| 2016/0288899 A1 | 10/2016 | Dobberfuhl et al. |
| 2016/0296994 A1 | 10/2016 | Hanninen et al. |
| 2016/0297511 A1 | 10/2016 | Barakatain et al. |
| 2016/0318597 A1* | 11/2016 | Kent ..................... B64C 3/18 |
| 2016/0355273 A1 | 12/2016 | Perez Diaz et al. |
| 2017/0291682 A1* | 10/2017 | Sullivan ................ E04C 3/09 |
| 2018/0346093 A1 | 12/2018 | Trop et al. |
| 2020/0377193 A1 | 12/2020 | Trop et al. |

FOREIGN PATENT DOCUMENTS

| | | |
|---|---|---|
| EP | 3078585 | 10/2016 |
| EP | 3409579 | 12/2019 |
| JP | 2014506213 A | 3/2014 |
| WO | 2008067460 | 6/2008 |
| WO | 2008067460 A2 | 6/2008 |

OTHER PUBLICATIONS

Japanese Patent Office, "Notice of Rejection", issued in connection with Japanese Application No. 2018-095215, dated Dec. 28, 2021, 8 pages.

Federal Institute of Industrial Property, "Official Action," issued in connection with Russian Appl. No 2018105972/11, dated May 7, 2021, 10 pages.

Canadian Intellectual Property Office, "Office Action," issued in connection with Canadian Appl. No. 2,995,637 dated Oct. 15, 2021, 8 pages.

Chouvion et al., "Interface Management in Wing-Box Assembly," SAE Technical Paper 2011-01-2640, Oct. 18, 2011, 10 pages.

European Patent Office, "Extended European Search Report," issued in connection with European Patent Application 18158588.6, dated Oct. 25, 2018, 9 pages.

United States Patent and Trademark Office, "Restriction Requirement", issued in connection with U.S. Appl. No. 15/610,598 dated Jun. 26, 2019, 5 pages.

United States Patent and Trademark Office, "Non-Final Office Action", issued in connection with U.S. Appl. No. 15/610,598 dated Aug. 15, 2019, 11 pages.

United States Patent and Trademark Office, "Final Office Action", issued in connection with U.S. Appl. No. 15/610,598 dated Dec. 16, 2019, 10 pages.

United States Patent and Trademark Office, "Advisory Action", issued in connection with U.S. Appl. No. 15/610,598 dated Feb. 28, 2020, 4 pages.

United States Patent and Trademark Office, "Notice of Allowance and Fee(s) Due", issued in connection with U.S. Appl. No. 15/610,598 dated Apr. 6, 2020, 9 pages.

Brazilian National Institute of Industrial Property, "Written Opinion," issued in connection with Brazilian Application No. 102018009917, dated Sep. 7, 2022, 6 pages.

* cited by examiner

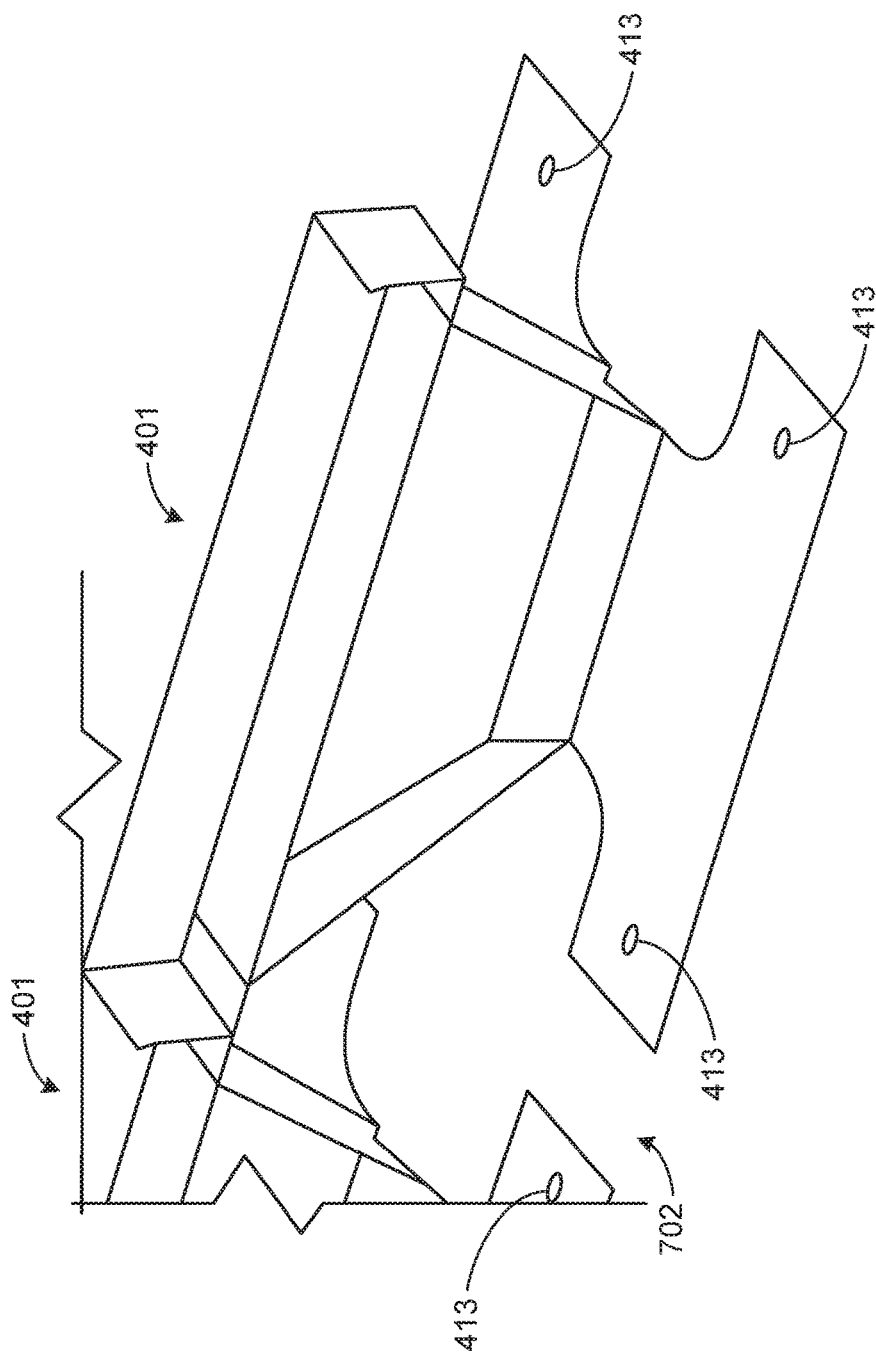

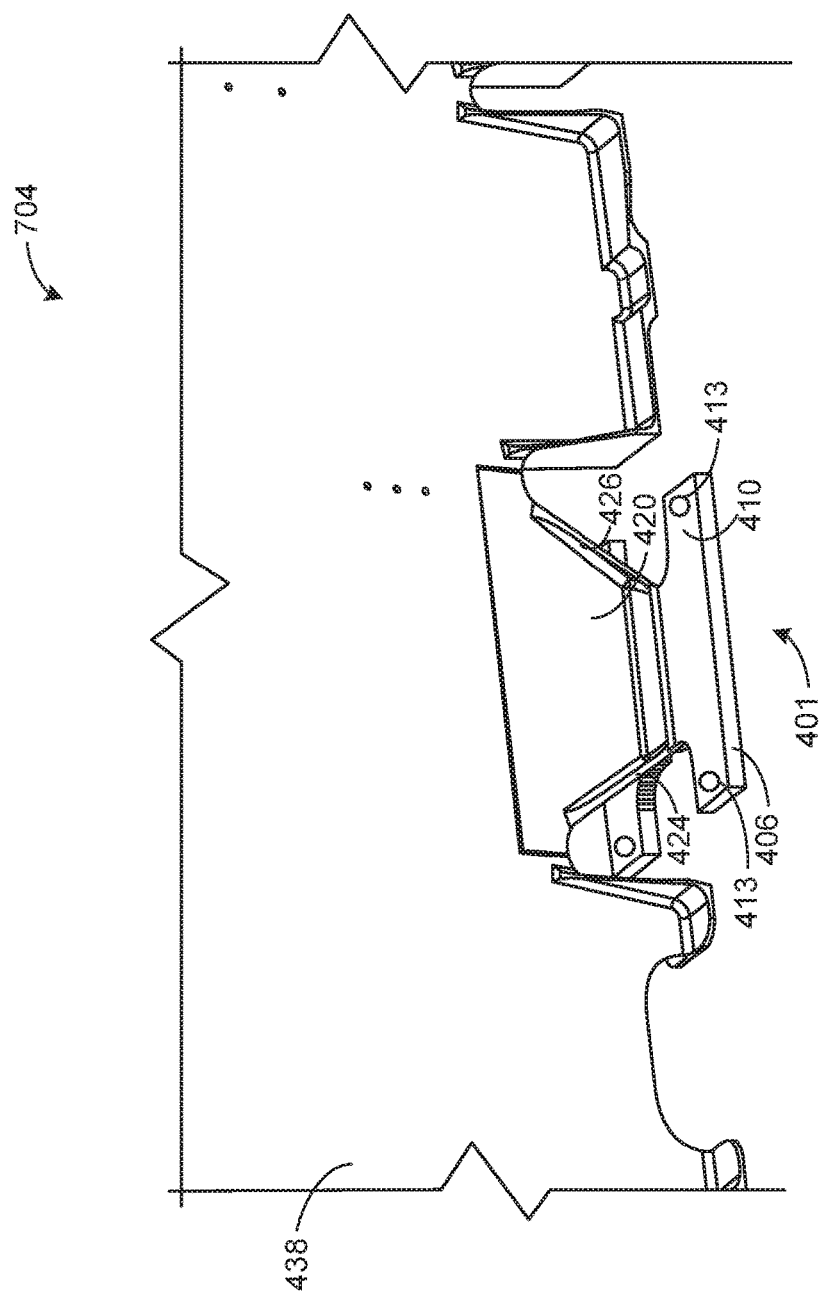

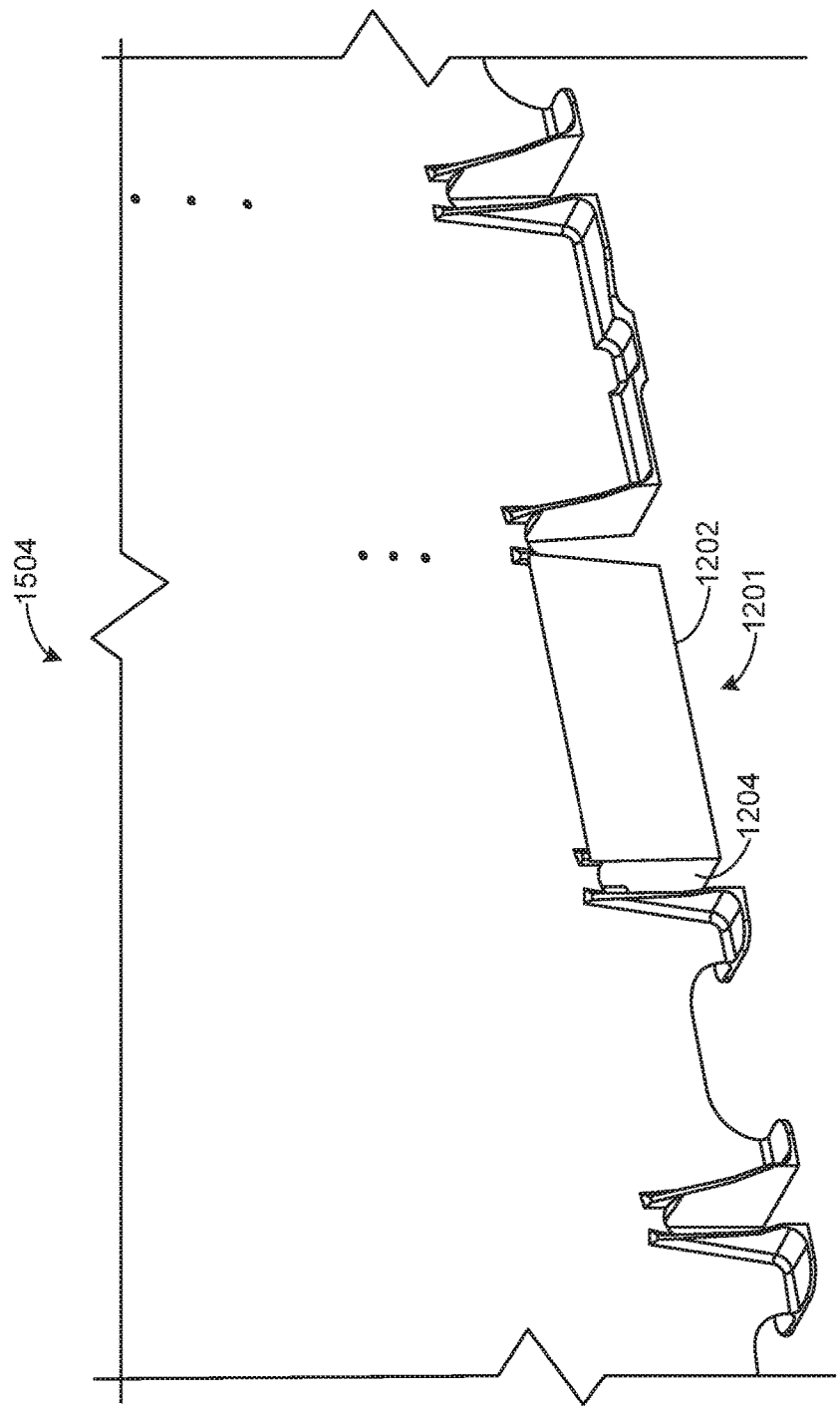

AIRCRAFT, AIRCRAFT WINGS AND ASSOCIATED SHEAR TIES

RELATED APPLICATION

This patent arises from a continuation of U.S. application Ser. No. 15/610,598 (now U.S. Pat. No. 10,745,103), titled "Aircraft, Aircraft Wings and Associated Shear Ties," filed May 31, 2017, which is hereby incorporated by this reference in its entirety.

FIELD OF THE DISCLOSURE

This disclosure relates generally to aircraft and, more particularly, to aircraft, aircraft wings and associated shear ties.

BACKGROUND

Many aircraft include wings. In some examples, these wings include ribs for structural stability and/or other reasons. To couple the ribs to the panels of the wings, in some examples, shear ties are used.

BRIEF DESCRIPTION OF THE DRAWINGS

FIG. 7A illustrates an isometric view of example shear ties structured according to FIGS. 4-6 that can be used to implement the example shear ties of FIGS. 2 and/or 3.

FIGS. 7B and 7C illustrate opposing isometric views of an example rib that can be used to implement the ribs of FIGS. 2 and/or 3.

FIGS. 15B and 15C illustrate opposing isometric views of an example rib that can be used to implement the ribs of FIGS. 2 and/or 3.

The figures are not to scale. Wherever possible, the same reference numbers will be used throughout the drawing(s) and accompanying written description to refer to the same or like parts.

DETAILED DESCRIPTION

Figure 1:
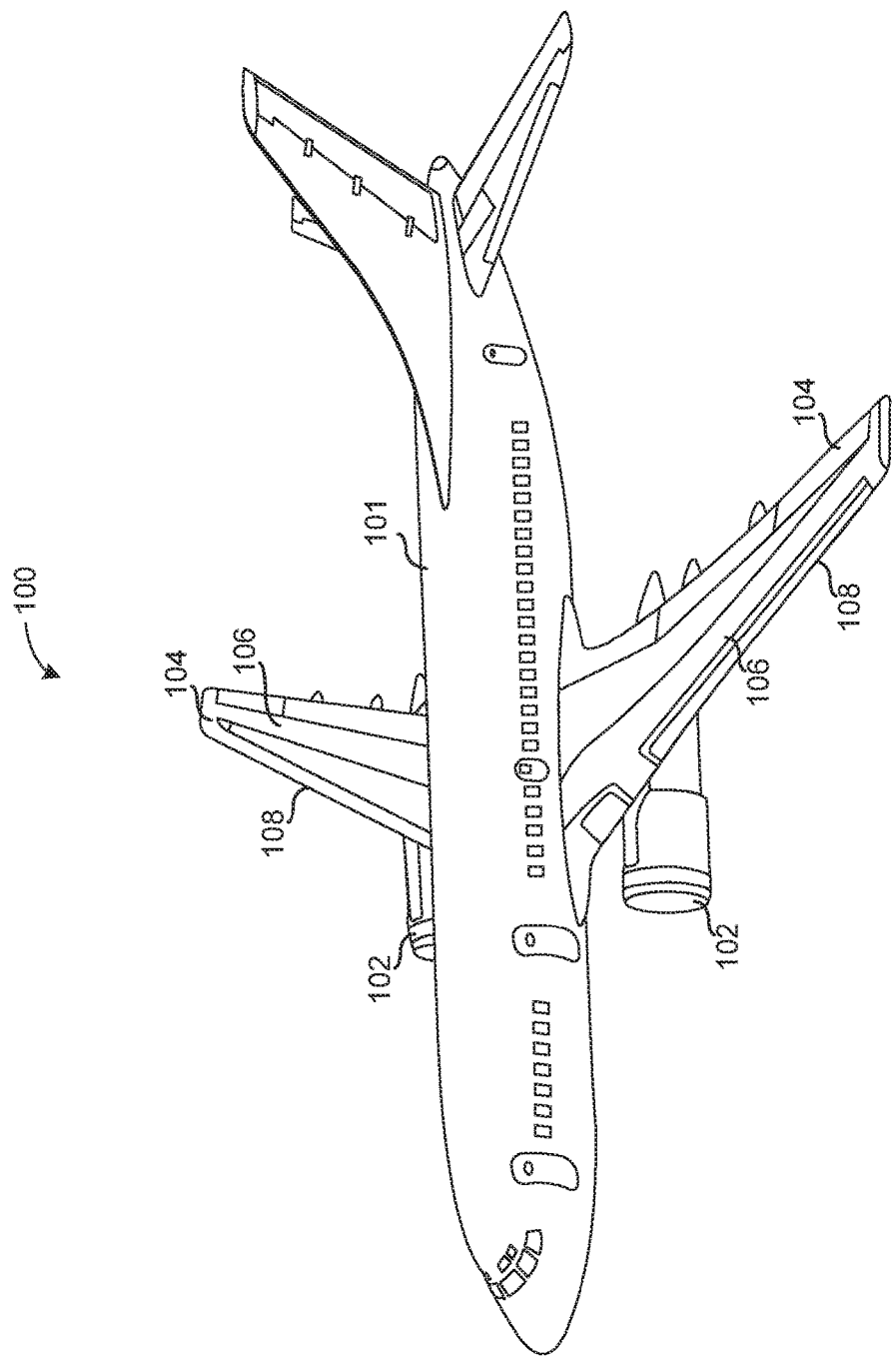
FIG. 1 is a schematic illustration of an example aircraft on which the example shear ties disclosed herein can be implemented.

The examples disclosed herein relate to example aircraft having integrally stiffened wing panels and/or skins (e.g., composite wing structures including metallic ribs) and/or composite wing panels and/or skins including fastened stringers. In some examples, aircraft implemented according to the teachings of this disclosure include example wings and/or example ribs having shear ties that reduce and/or eliminate the number of shims used when assembling the aircraft wing.

In some examples, the number of shims may be reduced by structuring the example shear ties to increase an allowable pull-up gap (e.g., a fastener pull up) and/or a build tolerance prior to coupling the rib to the adjacent components (e.g., the stringer, the panels) of the wing assembly while maintaining a threshold pull-up force(s). In some examples, the threshold pull-up gap may be approximately 0.012 inches and/or 0.016 inches and/or between about 0.008 inches and 0.016 inches. In some examples, the threshold pull-up force may be between about 250 pounds (lbs.) and 350 lbs. However, the threshold pull-up gap may be a different amount (e.g., 0.0.015 inches, 0.17 inches, 0.020 inches, 0.1 inches, etc.) depending on the design characteristics and/or design parameters. As used herein, the phrase "pull-up gap" refers to the gap between a shear tie and an opposing surface (e.g., a surface of a stiffener, a surface of a panel of a wing, etc.) prior to fastener installation and assembly. In other words, a greater allowable pull-up gap means that a shear tie is moved a greater distance to close and/or decrease a gap during the assembly process between the shear tie and a panel to which the shear tie is to be fastened. Similarly, a lesser allowable pull-up gap means that a shear tie is moved a lesser distance to close and/or decrease a gap during assembly between the shear tie and a panel to which the shear tie is to be fastened.

By reducing and/or eliminating the number of shims included between the ribs and the panels of the aircraft wing, in some examples, the weight of the aircraft may be reduced, the cost of producing the aircraft may be decreased and/or the throughput of manufacturing the aircraft may be increased all while providing a robust shear tie. By reducing and/or eliminating the number of shims included when assembling an aircraft wing, in some examples, the number of shimming mills in the assembly plant may be reduced, the footprint in the assembly plant associated with assembling the aircraft wing may be reduced, the production flow time may be reduced and/or recurring and/or non-recurring production costs may be reduced. Further, in some examples, by reducing and/or eliminating the number of shims included when assembling an aircraft wing, worker ergonomics may be improved given the weight of the shims and/or the confined space within the wing box where the shims would otherwise be placed.

In some examples, the shear ties disclosed herein are structured to have a moderate level of flexibility and/or compliance while not exceeding static and/or fatigue stresses allowable for the material of the shear tie and/or the associated rib. The shear ties and/or the rib may be formed of aluminum or any other suitable material. In some examples, the static stresses are between about 30-40 kilopounds per square inch (KSI) pounds and the fatigue stresses are between about 15-20 KSI.

The example shear ties disclosed herein may be formed as a one-sided shear tie and/or a two-sided shear tie including tabs (e.g., tab outs). As used herein, a one-sided shear tie provides fastening access from one side of the shear tie and a two-sided shear tie provides fastening access from both sides of the shear tie. The tabs may be relatively flexible and/or act as springs (e.g., a leaf spring) to increase the allowable pull-up gap between a shear tie and an associated wing panel. In other words, the flexibility of the tabs enables the tabs to be drawn toward an adjacent surface to close a relatively larger pull-up gap when a fastener(s) fastens the shear tie, the stringer and the associated panel. Additionally or alternatively, the example shear ties disclosed herein may be formed by scaling the example shear tie designs to achieve a threshold pull-up capability (e.g., 0.012 inch pull-up capability, a 0.016 inch pull-up capability). Regardless of the configuration of the example shear ties implemented according to the teachings of this disclosure, the examples disclosed herein reduce and/or eliminate the number of shims used when assembling an aircraft wing.

FIG. 1 depicts an example aircraft 100 including an example fuselage 101 and example engines 102 coupled to example wings 104. In this example, each of the wings 104 includes first and second panels 106, 108 that may be formed of a composite material and/or a carbon fiber reinforced plastic material.

Figure 2:
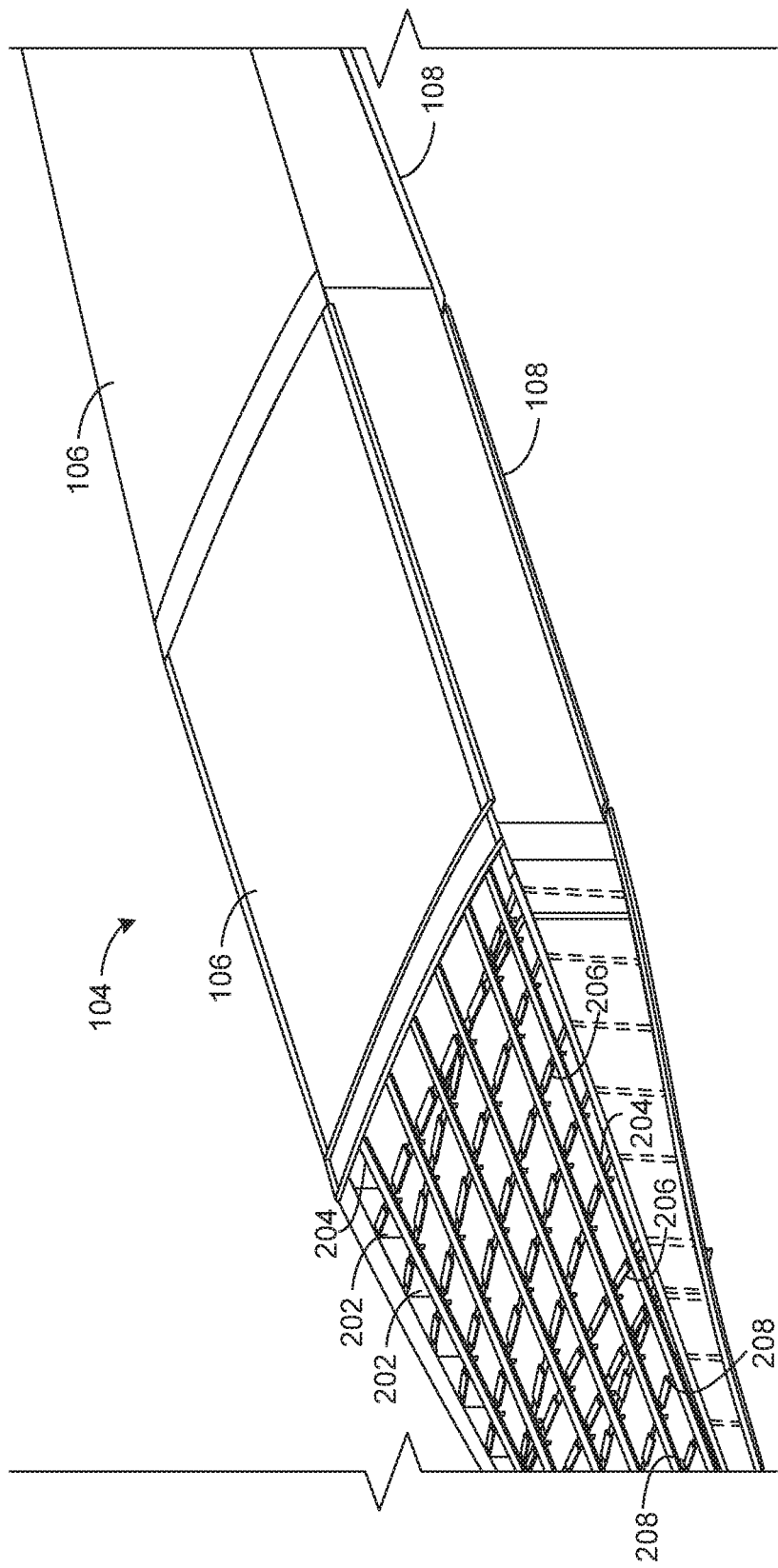
FIG. 2 illustrates a partial cutaway view of an example wing including example ribs having example shear ties in accordance with the teaching of this disclosure.

FIG. 2 illustrates a partial cutaway view of one of the example wings 104 that can be used to implement the wings 104 of the aircraft 100 of FIG. 1. In the illustrated example, the wing 104 includes the first and second panels 106, 108 and ribs 202 that extend in a chordwise direction between the first and second panels 106, 108. As shown in the illustrated example, to increase the stability of the respective panels 106, 108, example stringers 204 are coupled spanwise between the ribs 202 along the length of the wing 104. In some examples, some of the stringers 204 are disposed adjacent the first panel 106 and others of the stringers 204 are disposed adjacent the second panel 108.

To couple the ribs 202, the stringers 204 and the panels 106 and/or 108 together, in the illustrated example, the ribs 202 include example shear ties 206 through which fasteners 208 extend. The shear ties 206 may be integral to the ribs 202 or may be coupled to the ribs 202. In some examples, two fasteners 208 extend through the shear ties 206 that are implemented as one-sided shear ties where a one-sided shear tie provides fastening access from one side of the shear tie 206. In some examples, four fasteners 208 extend through the shear ties 206 that are implemented as two-sided shear ties where a two-sided shear tie provides fastening access from both sides of the shear tie 206. However, in other examples, any number of fasteners 208 may be used to couple the shear ties 206 to the first panel 106, the second panel 108 and/or the stringers 204.

Regardless of the configuration of the example shear ties 206 used to couple the stringers 204, the ribs 202 and the panels 106 and/or 108 together, the example shear ties 206 enable the pull-up gap between the shear ties 206, the stringer 204 and/or and the panel 106 and/or 108 to satisfy a threshold prior to the fasteners 208 coupling the shear ties 206, the stringers 204 and the panels 106 and/or 108 together. In some examples, a pull-up gap may be present prior to installing a fastener based on manufacturing variability and/or other factors. In some examples, the threshold pull-up gap that is closable using the examples disclosed herein may be greater than the pull-up gap that may be provided by known examples (e.g., 0.005 inches-0.008 inches). In some examples, the threshold pull-up gap is approximately 0.012 inches and/or 0.016 inches and/or between about 0.008 inches and 0.016 inches.

In some examples, the wing 104 may be assembled by positioning the stringers 204 spanwise overtop of the second panel 108 and positioning the ribs 202 chordwise overtop of the stringers 204 and adjacent the second panel 108. A pull-up gap may be defined between the shear tie 206 of the rib 202 and at least one of the stringer 204 or the second panel 108. In some examples, the wing 104 may be further assembled by positioning the stringers 204 spanwise overtop of the ribs 202 and adjacent the first panel 106. The fasteners 208, when installed, may decrease the pull-up gap between the shear ties 206, the stringer 204 and the first panel and/or the second panel 108.

Figure 3:
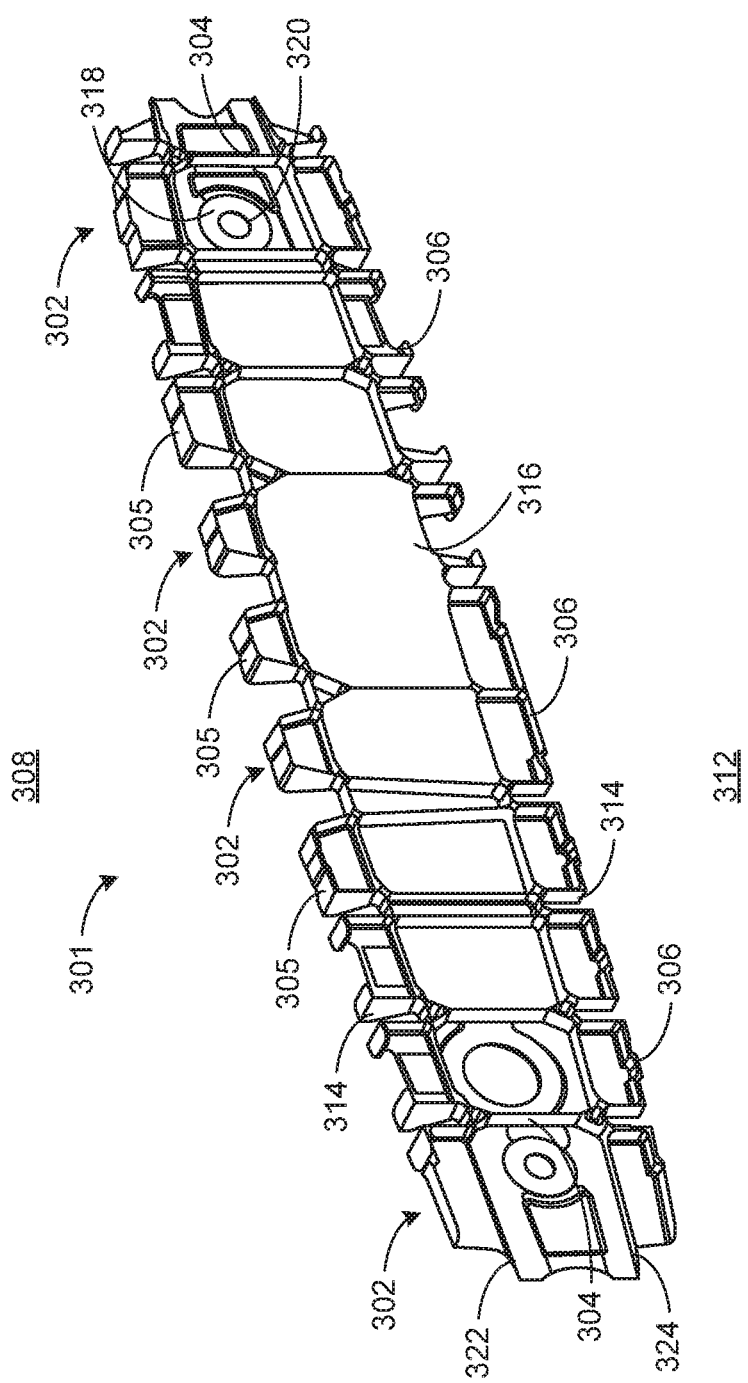
FIG. 3 illustrates an example rib that can be used to implement the ribs of FIG. 2.

FIG. 3 illustrates an isometric view of an example rib 301 that can be used to implement the example ribs 202 of FIG. 2. In the illustrated example, the rib 301 includes example bays 302, example stiffeners 304, and example shear ties 305 on a first side 308 of the rib 301 and example shear ties 306 on a second side 312 of the rib 301. To enable the stringers 204 to extend between the shear ties 305, 305, in this example, the rib 301 defines apertures 314 between adjacent ones of the shear ties 305, 306. Additionally, in the illustrated example, the rib 301 includes an example web 316, example web pads 318 surrounding example apertures 320, a first chord 322 adjacent the first side 308 of the rib 301 and a second chord 324 adjacent the second side 312 of the rib 301. As shown in the example of FIG. 3, the bays 302 are defined by the stiffeners 304 and the chords 322, 324.

Figure 4:
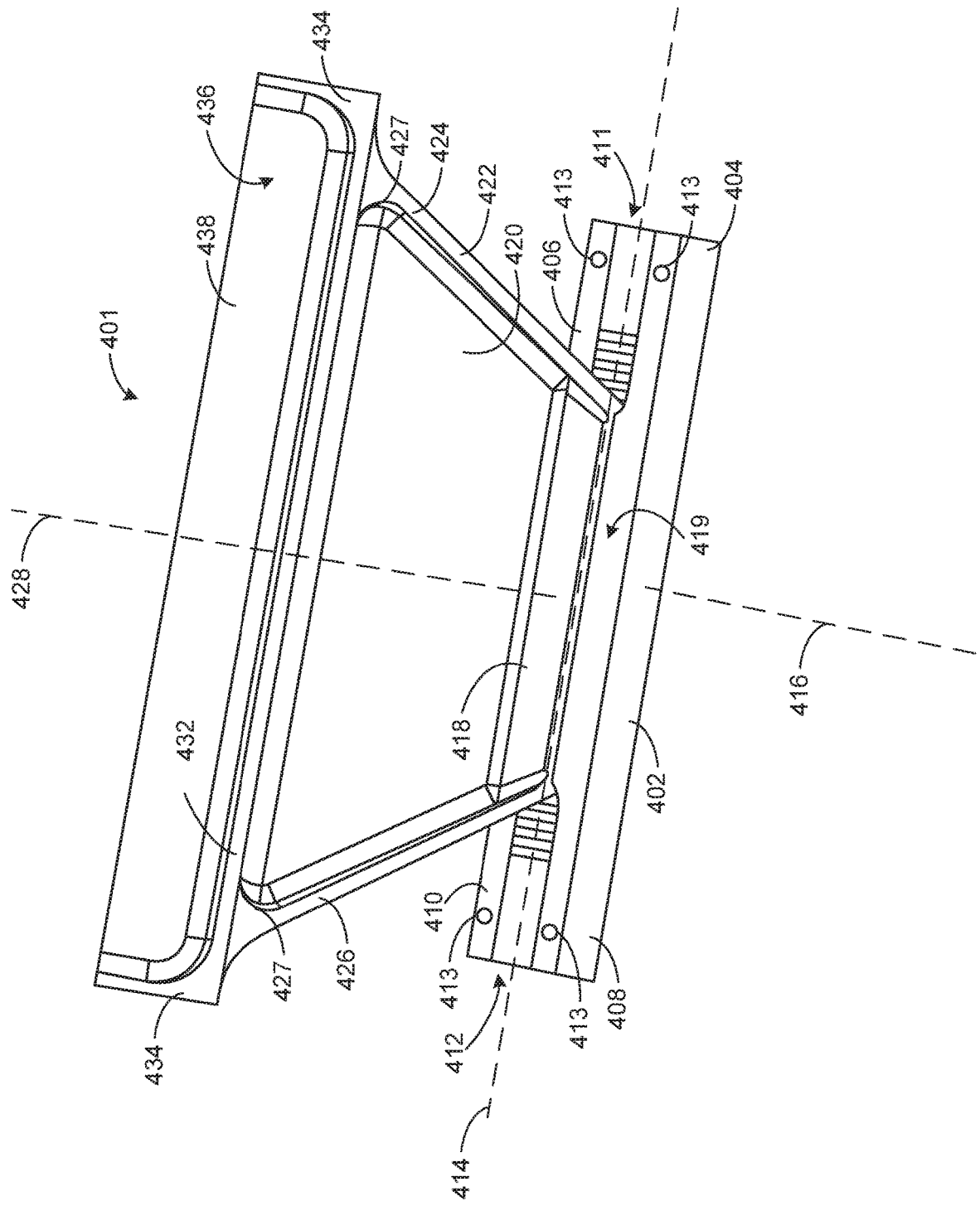
FIGS. 4-6 illustrate different views of an example first shear tie that can be used to implement the example shear ties of FIGS. 2 and/or 3.
Figure 5:
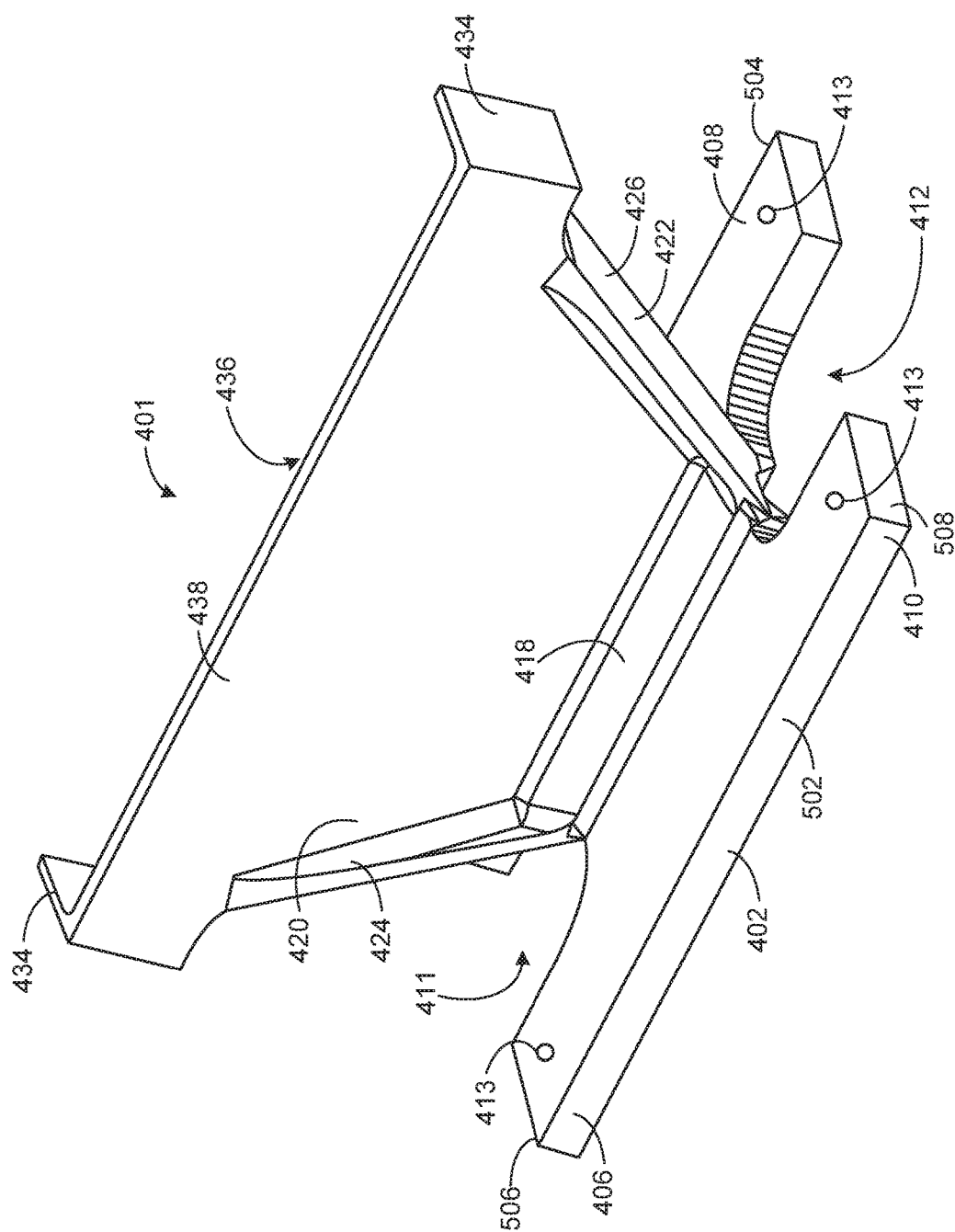
Figure 6:
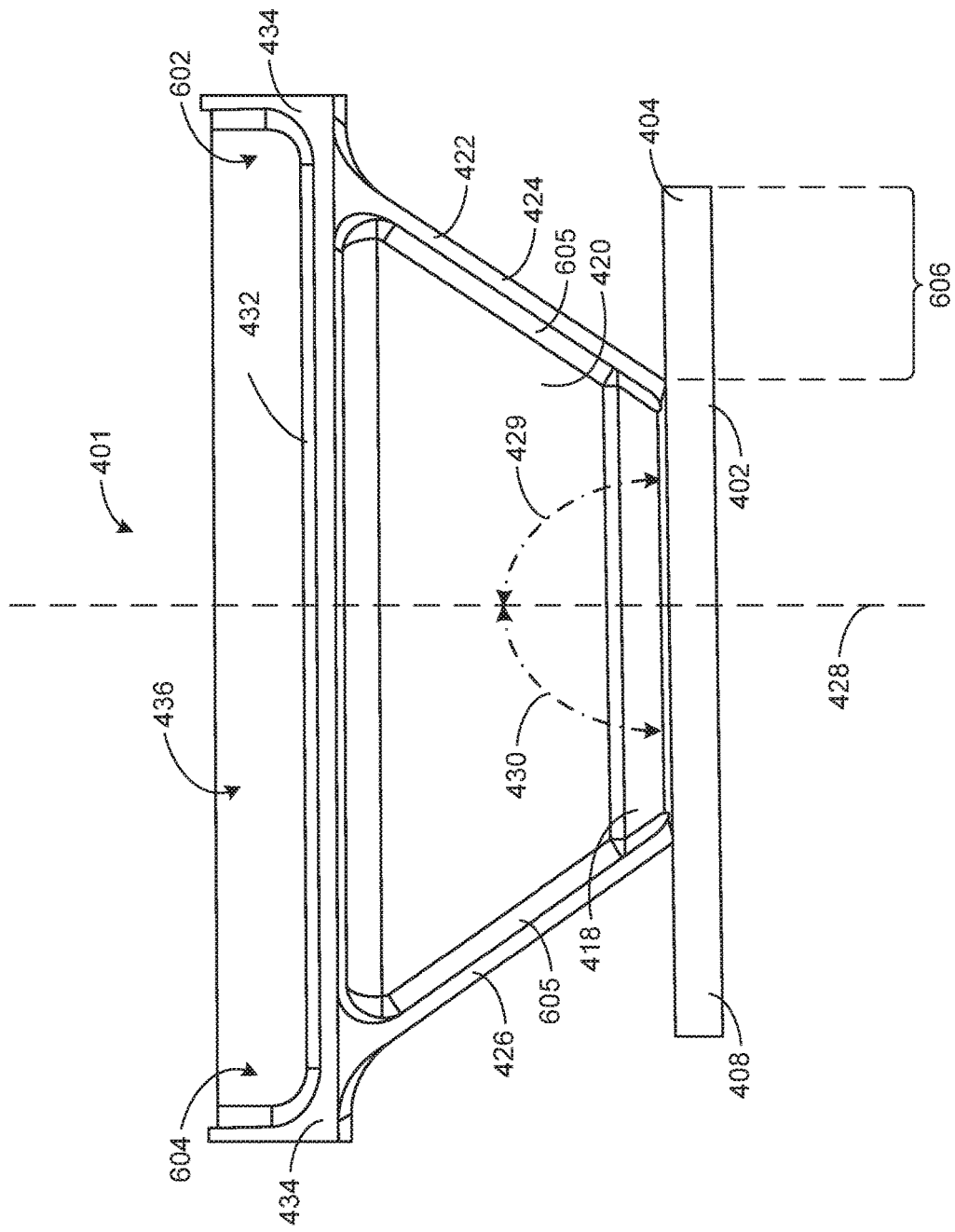

FIGS. 4-6 illustrate different views of an example shear tie 401 that can be used to implement the shear ties 206 of FIG. 2 and/or the shear ties 305, 306 of FIG. 3. In the illustrated example of FIG. 4, the shear tie 401 is a two-sided shear tie including a cleat and/or a base 402 having a first tab and/or leg 404, a second tab and/or leg 406, a third tab and/or leg 408 and a forth tab and/or leg 410. In this example, the first and second legs 404, 406 are spaced from one another by an example first arc-shaped aperture 411 and the third and fourth legs 408, 410 are spaced from one another by an example second arc-shaped aperture 412. While the apertures 411, 412 are arch-shaped in this example, the apertures 411, 412 may be any other shape.

In some examples, spacing the first and second legs 404, 406 from one another and spacing the third and fourth legs 408 410 from one another increases the flexibility of the legs 404, 406, 408 and 410 and/or enables a length of legs 404, 406, 408 and 410 to be lesser as compared to some examples disclosed herein. For example, the legs 404, 406, 408 and 410 may be structured to be relatively flexible and/or to act as leaf springs to enable a threshold pull-up gap to be closed and/or decreased when coupling the rib 202 and the first and/or second panels 106, 108 and/or the stringers 204. In some examples, the threshold pull-up gap is 0.012 inches and/or 0.016 inches and/or between about 0.008 inches and 0.016 inches. However, the threshold pull-up gap may be any other distance depending on the design specifications, etc.

In some examples, to enable the shear tie 401 to be coupled to the first and/or second panels 106, 108 and/or to the stringers 204, the legs 404, 406, 408 and 410 define apertures 413 through which the fasteners 208 extend. The apertures 413 may be positioned toward the edges and/or ends of the legs 404, 406, 408 and 410 to maximize the flexibility of the legs 404, 406, 408 and 410. In this example, the apertures 413 are symmetric about a longitudinal axis 414 and/or a transverse axis 416 of the shear tie 401. However, in other examples, the apertures 413 are not symmetric about the longitudinal axis 414 and/or the transverse axis 416. While the apertures 413 are depicted in particular locations on the legs 404, 406, 408 and 410 and having a particular size and shape, the apertures 413 may be in any other location and may have any size and/or shape. While the legs 404, 406, 408 and 410 are shown including a single aperture, more or fewer apertures may be defined by one or more of the legs 404, 406, 408 and 410 (e.g., 0, 2, 3, etc.).

In the illustrated example, an example fillet and/or an angled intersection 418 extends along a central portion 419 of the cleat 402 to couple the cleat 402 and an example web 420 of the shear tie 401. In this example, to enable forces and/or loads (e.g., shear loads) to be transferred through the shear tie 401 and/or to provide a load path for the rib 202, the stringer 204, the first panel 106 and/or the second panel 108, the shear tie 401 includes an example flange 422 that bounds the web 420. In some examples, the flange 422 is a V-shaped flange and/or a stiffener that is angled relative to the cleat 402 to form a V-shaped web. In the example of FIG. 4, the flange 422 includes a first portion 424 and a second portion 426 that are symmetric about a centerline and/or axis 428 of the web 420. However, in other examples, the first and second portions 424, 426 may not be symmetric. In this example, the first portion 424 is at between about a 20-degree angle and a 70-degree angle 429 (FIG. 6) relative to the centerline 428 of the second portion 401 and the second portion 426 is at between about a negative 20-degree angle and a negative 70-degree angle 430 (FIG. 6) relative to the centerline 428.

In the illustrated example, the first and second portions 424, 426 of the flange 422 are coupled to an example chord 432 that can be used to implement the chord 322 and/or 324 of FIG. 3. As shown in the example of FIG. 4, corners 427 of the web 420 adjacent the coupling between the flange 422 and the chord 432 may be rounded. To form the rounded corners, in this example, the first and second portions 424, 426 of the flange 422 are splayed adjacent the coupling with the chord 432. In this example, stiffeners 434 extend from the chord 432 and define a bay 436 in which a web 438 is disposed.

FIG. 5 illustrates another isometric view of the example shear tie 401 of FIG. 4 showing an opposite side of the shear tie 401 as compared to the view shown in FIG. 4. As shown in FIG. 5, first opposing edges and/or sides 502, 504 are substantially parallel to one another and second opposing edges and/or sides 506, 508 of the cleat 402 are substantially parallel to one another. As used herein, substantially parallel means between about zero and five degrees of parallel and/or accounts for manufacturing tolerances.

FIG. 6 illustrates an elevation view of the example shear tie 401 of FIG. 4. As shown in the example of FIG. 6, the chord 432 and the stiffeners 434 define opposing fittings (e.g., bathtub fittings) 602, 604 having rounded corners. In this example, chamfered and/or angled surfaces and/or fillets 605 are provided at the intersection between the web 420 and the flange 422. FIG. 7A illustrates two of the shear ties 401 of FIG. 4 being formed of a single piece of material (e.g., a monolithic part) to enable the shear ties 401 to be coupled together. In the example of FIG. 7A, the adjacent shear ties 401 define an aperture 702 through which the stringer 204 extends when the shear tie 401 is used to couple the rib 202, the stringer 204 and the first panel 106 and/or the second panel 108 together.

Figure 7B:
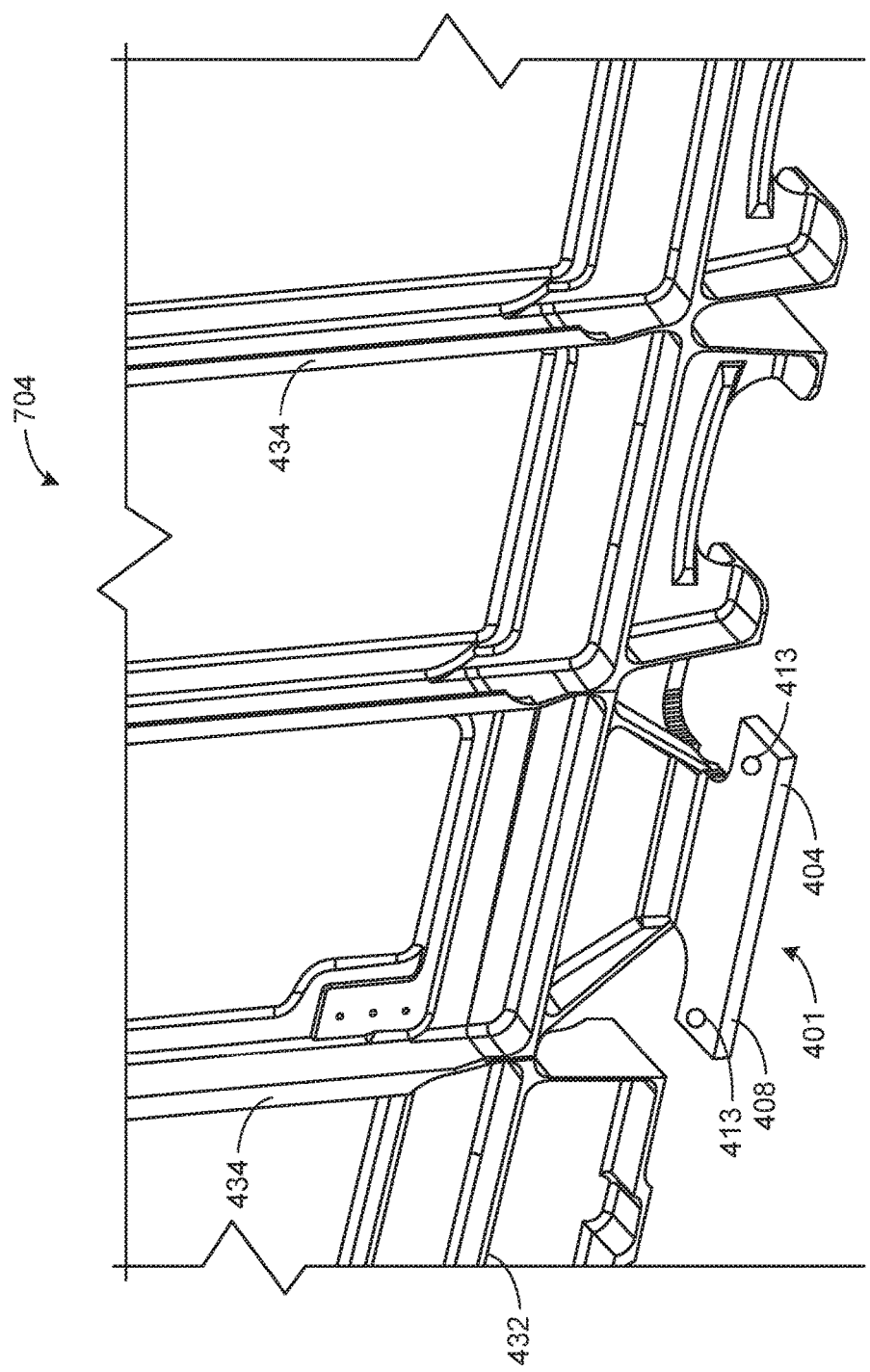

FIGS. 7B and 7C illustrate opposing isometric views of an example rib 704 that can be used to implement the example rib 202 of FIG. 2 and/or the example rib 301 of FIG. 3. In the illustrated example of FIGS. 7B and 7C, the shear tie 401 is structured according to the example shear tie 401 of FIGS. 4-6 where the side shown in FIG. 7B includes the chord 432 and the stiffeners 434 and the side shown in FIG. 7C does not include the chord 432 and the stiffeners 434. Thus, the side of the rib 704 shown in FIG. 7C illustrates the web 438 without the inclusion of the chord 432 and the stiffeners 434. While the example rib 704 of FIGS. 7B and 7C includes one shear tie structured according to the example shear tie of FIGS. 4-6, the rib 704 of FIGS. 7*b* and 7C may include any number of such shear ties. Referring to FIG. 7B, the example rib 704 includes the chord 432 and the stiffeners 434 that extend substantially perpendicularly relative to one another. As used herein, substantially perpendicularly means between about zero degrees and five degrees of perpendicular and/or accounts for manufacturing tolerances.

Figure 8:
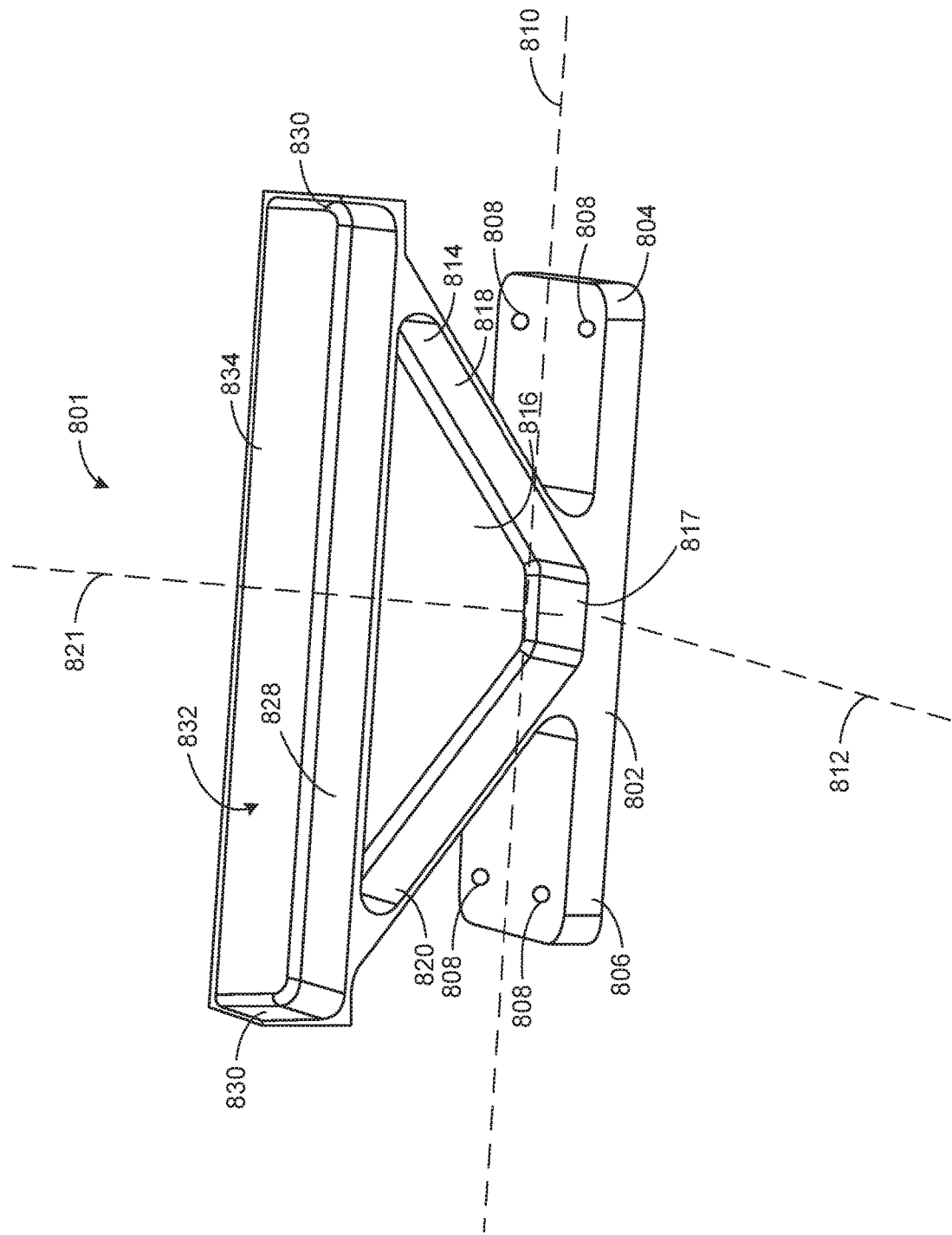
FIGS. 8-10 illustrate different views of an example second shear tie that can be used to implement the shear ties of FIGS. 2 and/or 3.
Figure 9:
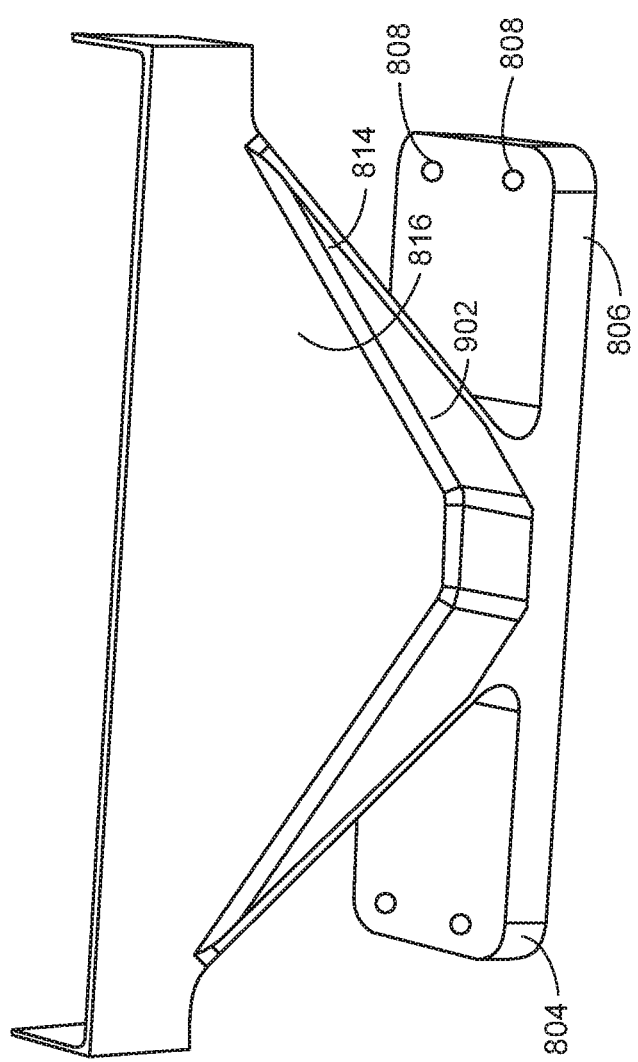
Figure 10:
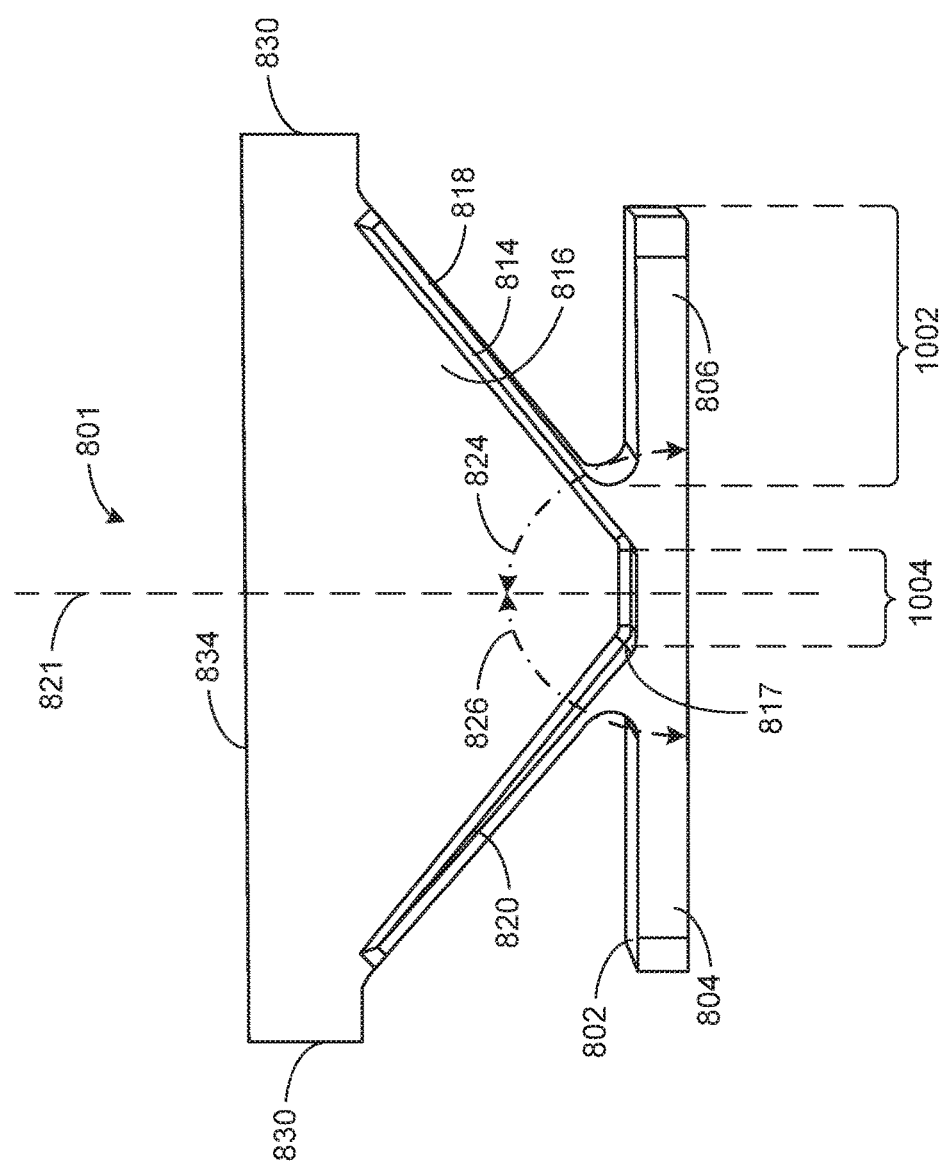

FIGS. 8-10 illustrate different views of another example shear tie 801 that can be used to implement the shear ties 206 of FIG. 2 and/or the shear ties 305 and/or 306 of FIG. 3. In the illustrated example of FIG. 8, the shear tie 801 is a two-sided shear tie including a cleat 802 having a first tab and/or leg 804 and a second tab and/or leg 806. In contrast to the example of FIGS. 4-6, the first leg 804 of FIG. 8 is formed as a single leg without an aperture separating the first leg 804 into a first sub-leg (e.g., the first leg 404) and a second sub-leg (e.g., the second leg 406) and without separating the second leg 806 into a third sub-leg (e.g., the third leg 408) and a fourth sub-leg (e.g., the fourth leg 410).

In contrast to the example of FIG. 4-6, to compensate for the width of the legs 804, 806 of FIG. 8 being greater than the width of the legs 404, 406, 408 and 410 of FIG. 4 and to enable the first and second legs 804, 806 of FIG. 8 to attain similar flexibly to the example legs 404, 406, 408 and 410 of FIG. 4, a length 1002 (FIG. 10) of the first leg 804 is greater than a length 606 (FIG. 6) of the first leg 404. In some examples, the legs 804, 806 are structured to be relatively flexible to enable a threshold pull-up gap to be achieved, closed and/or decreased when coupling the rib 202 and the first and/or second panels 106, 108 and/or the stringers 204. In some examples, the threshold pull-up gap is 0.012 inches and/or 0.016 inches and/or between about 0.008 inches and 0.016 inches. However, the threshold pull-up gap may be any other distance depending on the design specifications, etc.

In some examples, to enable the shear tie 801 to be coupled to the first and/or second panels 106, 108 and/or to the stringers 204, the legs 804, 806 define apertures 808 through which the fasteners 208 extend. While the apertures 808 are depicted in particular locations on the legs 804, 806 and having a particular size and shape, the apertures 808 may be in any other location and may have any size and/or shape. While each of the legs 804, 806 is shown as including two apertures, more or fewer apertures may be defined by one or more of the legs 804, 806 (e.g., 0, 1, 3, etc.). In some examples, the apertures 808 are symmetric about a longitudinal axis 810 and/or a transverse axis 812 of the shear tie 801. However, in other examples, the apertures 808 are not be symmetric about the longitudinal axis 810 and/or the transverse axis 812.

In this example, to enable forces and/or loads (e.g., shear loads) to be transferred through the shear tie 801, an example flange 814 extends from the cleat 802 and bounds an example web 816 of the shear tie 801. Based on the first and second legs 804, 806 being longer relative to the legs 404, 406, 408 and 410 of FIG. 4, in this example, a central portion 817 of the cleat 802 that bounds the web 816 has a width 1004 (FIG. 10) that is lesser than a width of the central portion 419 of FIG. 4.

In the illustrated example, the flange 814 is angled relative to the cleat 802 to form a V-shaped web. In the example of FIG. 8, the flange 814 includes a first portion 818 and a second portion 820 that are symmetric about a centerline and/or axis 821 of the web 816. However, in other examples, the first and second portions 818, 820 may not be symmetric. In this example, the first portion 818 is at between about a 20-degree angle and a 70-degree angle 824 (FIG. 10) relative to the centerline 821 and the second portion 820 is at between about a negative 20-degree angle and a negative 70-degree angle 826 (FIG. 10) relative to the centerline 821.

In the illustrated example, the flange 814 is coupled to a chord 828 that can be used to implement the chord 322 and/or 324 of FIG. 3. In this example, stiffeners 830 extend from the chord 828 and define a bay 832 in which a web 834 is disposed. In some examples, the web 834 can be used to implement the web 316 of FIG. 3.

Figure 11A:
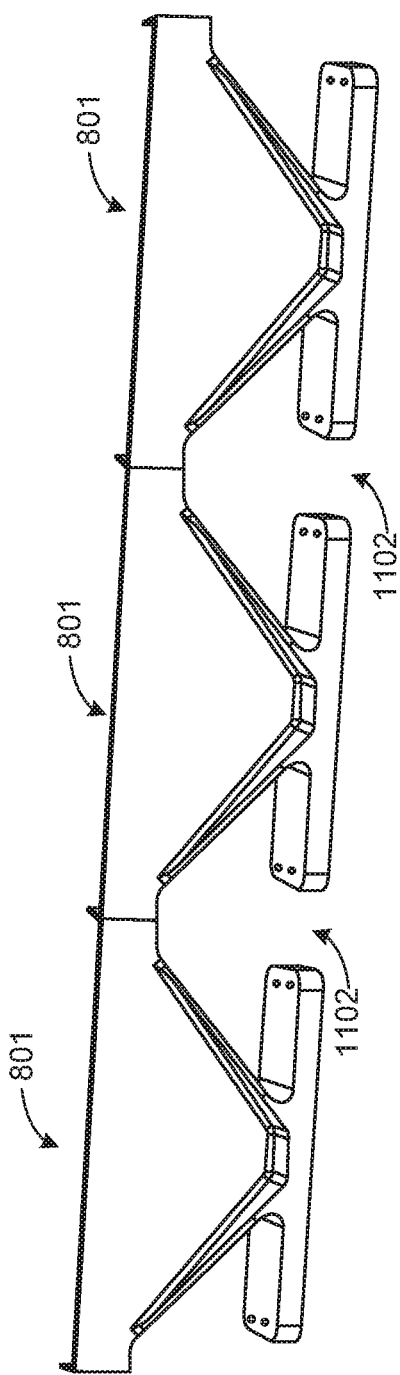
FIG. 11A illustrates an isometric view of example shear ties structured according to FIGS. 8-10 that can be used to implement the example shear ties of FIGS. 2 and/or 3.

FIG. 9 illustrates another isometric view of the example shear tie 801 of FIG. 8 showing an opposite side of the shear tie 801 as compared to the view shown in FIG. 8 where the side of the shear tie 801 shown in FIG. 8 includes the chord 828 and the stiffeners 830 and the side of the shear tie 801 shown in FIG. 9 does not include the chord 828 and the stiffeners 830. Thus, the side of the shear tie 801 shown in FIG. 9 illustrates the web 834 without the inclusion of the chord 828 and the stiffeners 830. In this example, chamfered and/or angled surfaces and/or fillets 902 are provided at the intersection between the web 816 and the flange 814. FIG. 10 illustrates an elevation view of the example shear tie 801 of FIG. 8 where the side of the shear tie 801 shown in FIG. 10 is the same side of the shear tie 801 as shown in FIG. 9. In this example, the chord 828 and the stiffeners 830 are shown in the view of FIG. 8 but not in the view of FIG. 10. FIG. 11A illustrates three of the shear ties 801 being formed of a single piece of material (e.g., a monolithic part) to enable the shear ties 801 to be coupled together. In the example of FIG. 11A, the adjacent shear ties 801 define apertures 1102 through which the stringers 204 extend when the shear tie 801 is used to couple the rib 202, the stringers 204 and the first panel 106 and/or the second panel 108 together.

Figure 11B:
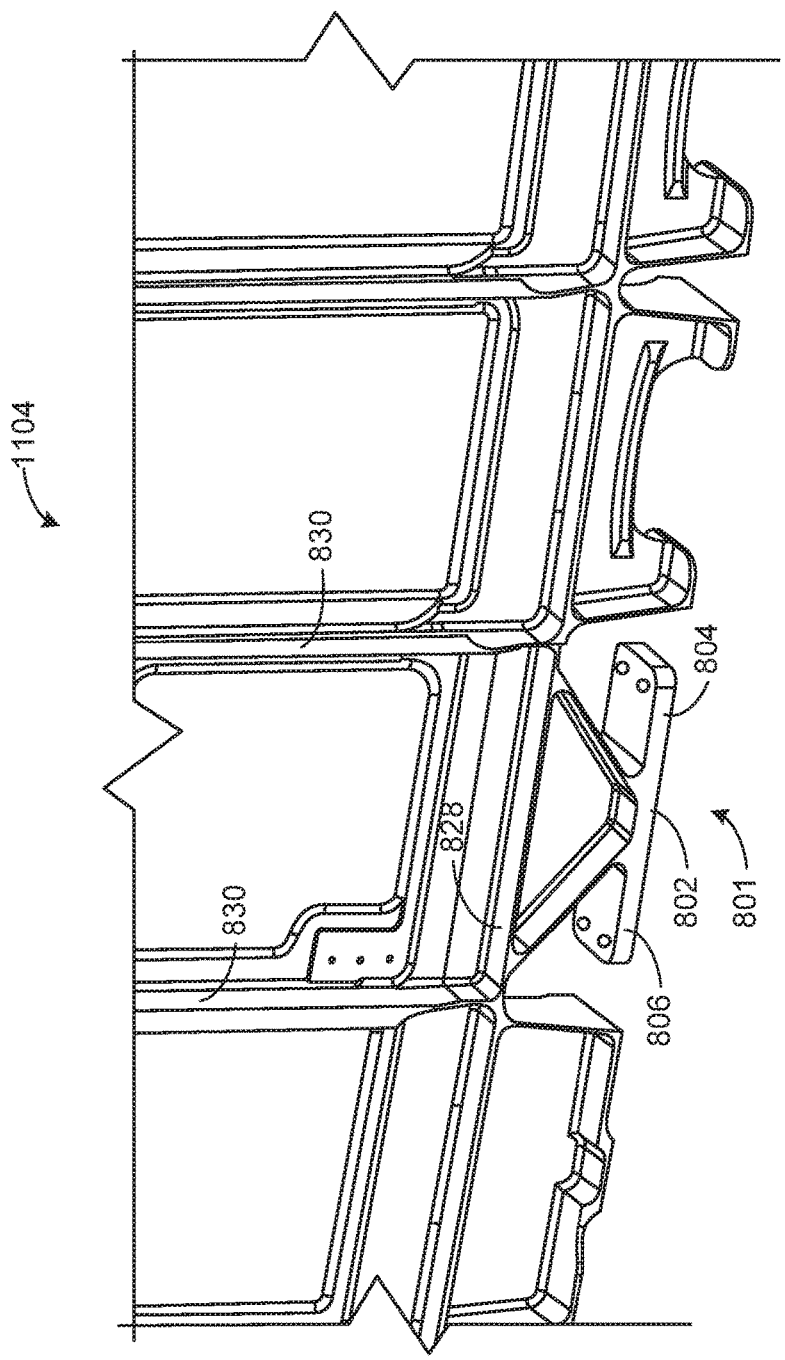
FIGS. 11B and 11C illustrate opposing isometric views of an example rib that can be used to implement the ribs of FIGS. 2 and/or 3.
Figure 11C:
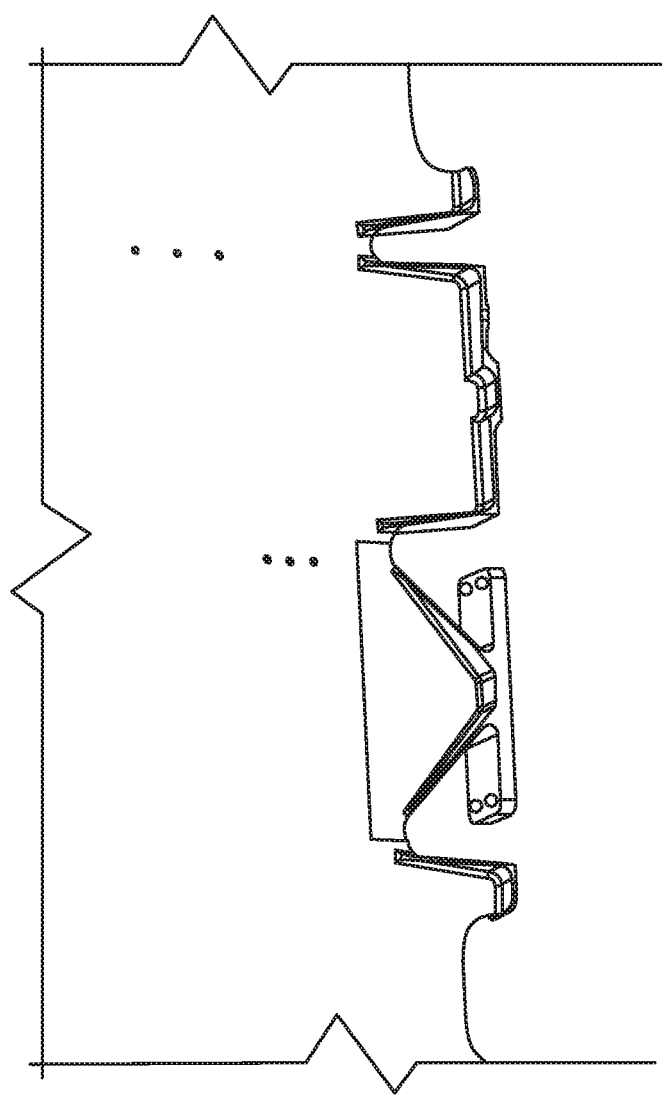

FIGS. 11B and 11C illustrate opposing isometric views of an example rib 1104 that can be used to implement the example rib 202 of FIG. 2 and/or the rib 301 of FIG. 3. In the illustrated examples of FIGS. 11B and 11C, the shear tie 801 is structured according to the example shear tie 801 of FIGS. 8-10. While the example rib 1104 of FIGS. 11B and 11C includes one shear tie structured according to the example shear tie of FIGS. 8-10, the rib 1104 of FIGS. 11b and 11C may include any number of such shear ties.

Figure 12:
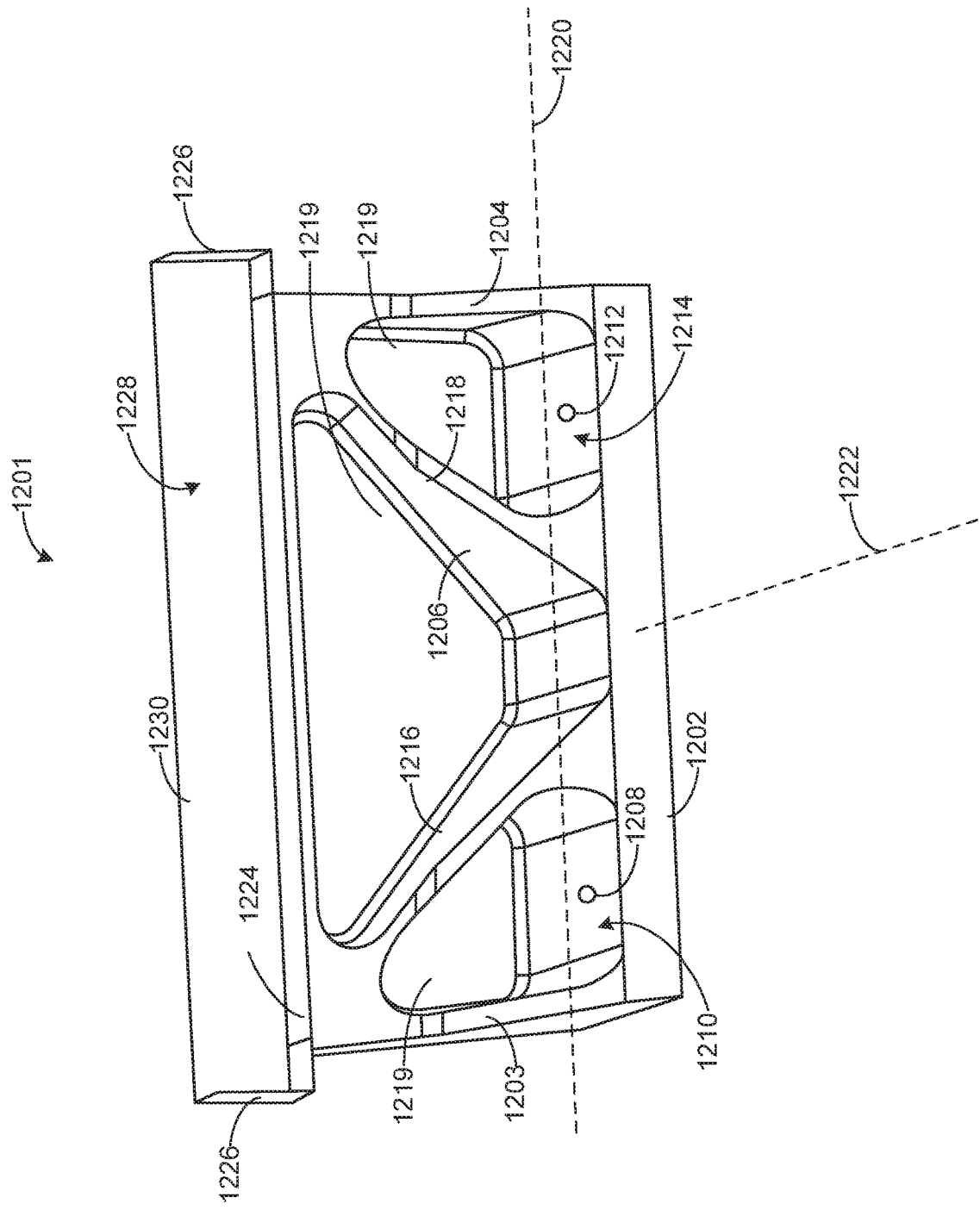
FIGS. 12-14 illustrate different views of an example third shear tie that can be used to implement the example shear ties of FIGS. 2 and/or 3.
Figure 13:
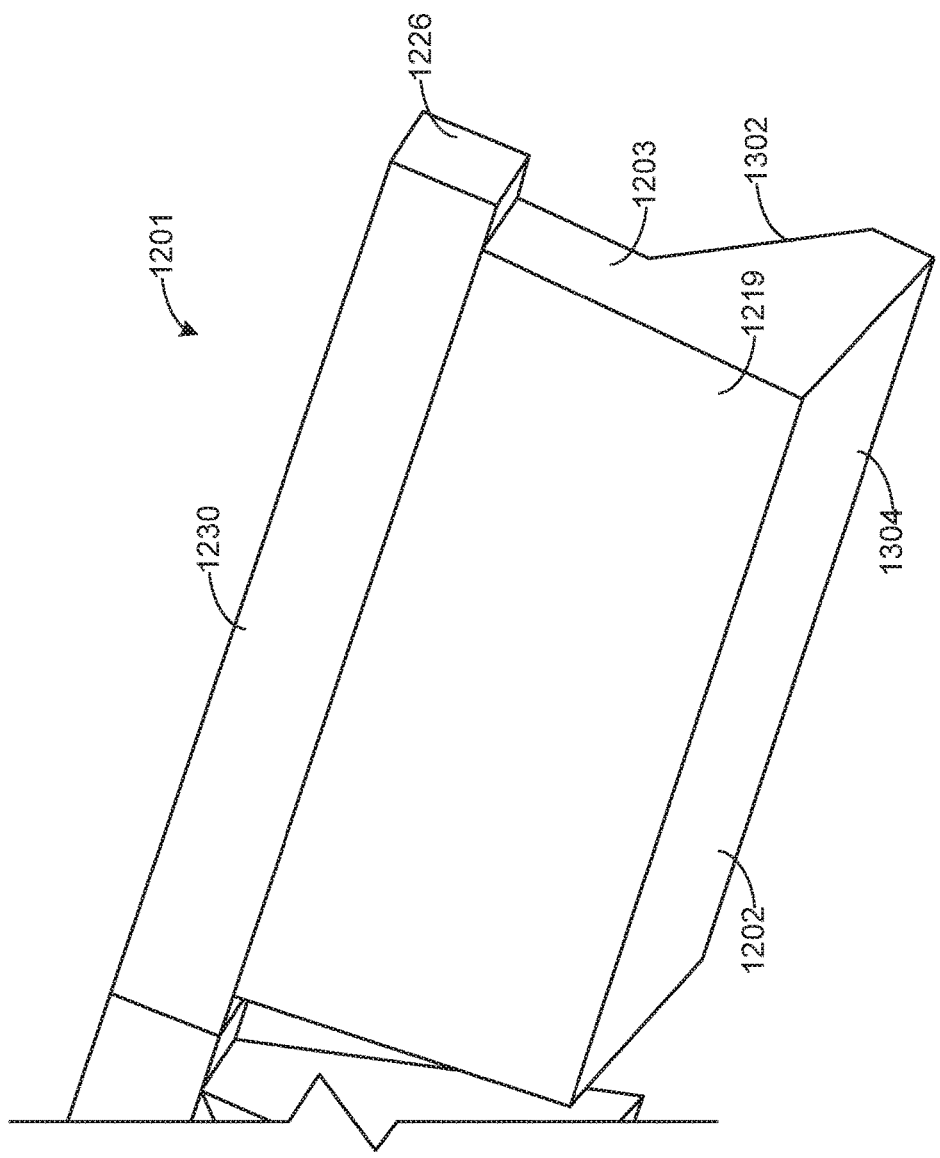
Figure 14:
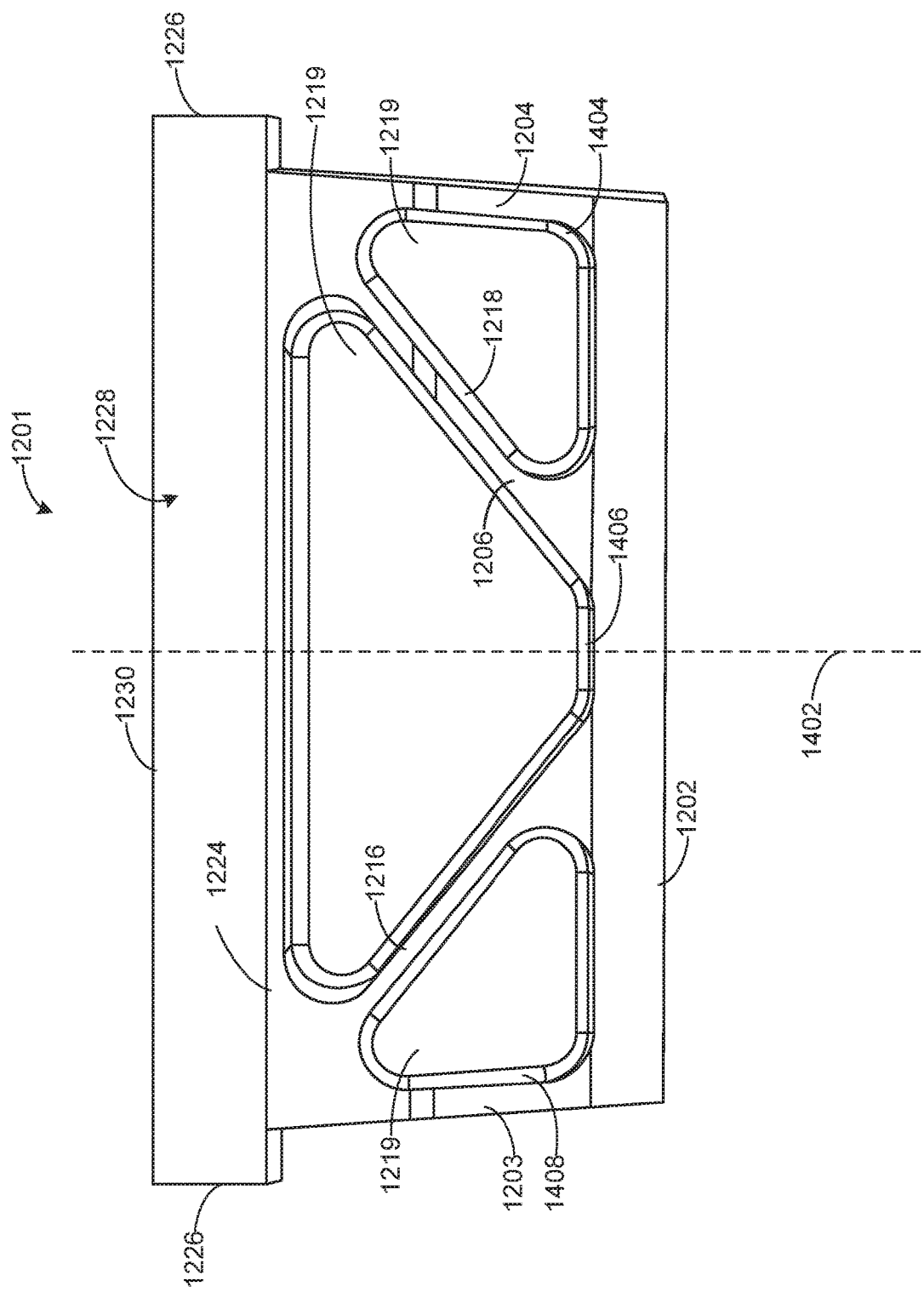

FIGS. 12-14 illustrate different views of another example shear tie 1201 that can be used to implement the shear ties 206 of FIG. 2 and/or the shear ties 305, 306 of FIG. 3. In the illustrated example of FIG. 12, the shear tie 1201 is a one-sided shear tie including a cleat 1202 from which a first flange 1203, a second flange 1204 and a V-shaped stiffener and/or flange 1206 extend. In some examples, the first and second flanges 1203, 1204 are structured and/or configured to receive and/or transfer first forces and/or loads (e.g., heal/toe effect loads) and the V-shaped stiffener 1206 is structured and/or configured to receive and/or transfer second forces and/or loads (e.g., shear loads).

In the illustrated example, a first aperture 1208 is defined by the cleat 1202 and associated with a first fitting (e.g., a first bathtub fitting) 1210 and a second aperture 1212 is defined by the cleat 1202 and associated with a second fitting (e.g., a second bathtub fitting) 1214. In this example, the first fitting 1210 is defined by the cleat 1202, the first flange 1203 and a first portion 1216 of the V-shaped stiffener 1206 and the second fitting 1214 is defined by the cleat 1202, the second flange 1204 and a second portion 1218 of the V-shaped stiffener 1206. As shown in the illustrated example, the cleat 1202, the first flange 1203, the V-shaped stiffener 1206 and the second flange 1204 bound different portions of a web 1219 of the shear tie 1201.

In some examples, the apertures 1208, 1212 are offset and/or non-symmetric relative to a longitudinal axis 1220 of the shear tie 206. In some examples, the apertures 1208, 1212 are symmetric relative to a transverse axis 1222 of the shear tie 1201. However, in other examples, the apertures 1208, 1212 are symmetrically positioned relative to the longitudinal axis 1220 and/or non-symmetrically positioned relative to the transverse axis 1222. Further, while the apertures 1208, 1212 are depicted in particular locations on the fittings 1210, 1214, the apertures 1208, 1212 may be in any other locations. While the fittings 1210, 1214 are shown having one aperture, more or fewer apertures may be defined by the cleat 1202.

In some examples, the cleat 1202, the first flange 1203, the second flange 1204 and the V-shaped stiffener 1206 are structured to be relatively flexible to enable a threshold pull-up gap to be closed and/or decreased when coupling the rib 202 to the first and/or second panels 106, 108 and/or to the stringers 204. In some examples, the threshold pull-up gap is 0.012 inches and/or 0.016 inches and/or between about 0.008 inches and 0.016 inches. However, the threshold pull-up gap may be any other distance depending on the design specifications, etc. In the illustrated example, the first flange 1203, the V-shaped stiffener 1206 and/or the second flange 1204 are coupled to an example chord 1224 that can be used to implement the chord 322 and/or 324 of FIG. 3. In this example, stiffeners 1226 extend from the chord 1224 and define a bay 1228 in which a web 1230 is disposed.

FIG. 13 illustrates another isometric view of the example shear tie 1201 of FIG. 12 showing an opposite side of the shear tie 1201 as compared to the view shown in FIG. 12. As shown in the example of FIG. 13, the first flange 1203 is L-shaped including a tapered surface 1302 relative to a base 1304 of the cleat 1202. However, the flanges 1203, 1204 may have any other cross-section. In this example, the chord 1224 and the stiffeners 1226 are shown in FIG. 12 but not in FIG. 13. FIG. 14 illustrates an elevation view of the example shear tie 1201 of FIG. 12. As shown in the example of FIG. 14, the shear tie 1201 is symmetric about a center line and/or axis 1402. However, in other examples, the shear tie 1201 is not symmetric relative to the center line 1402. Further, as shown in the example of FIG. 14, chamfered and/or tapered surfaces and/or fillets 1404, 1406, 1408 are provided at the intersection between the web 1219 and the flanges 1203, 1204, 1206.

Figure 15A:
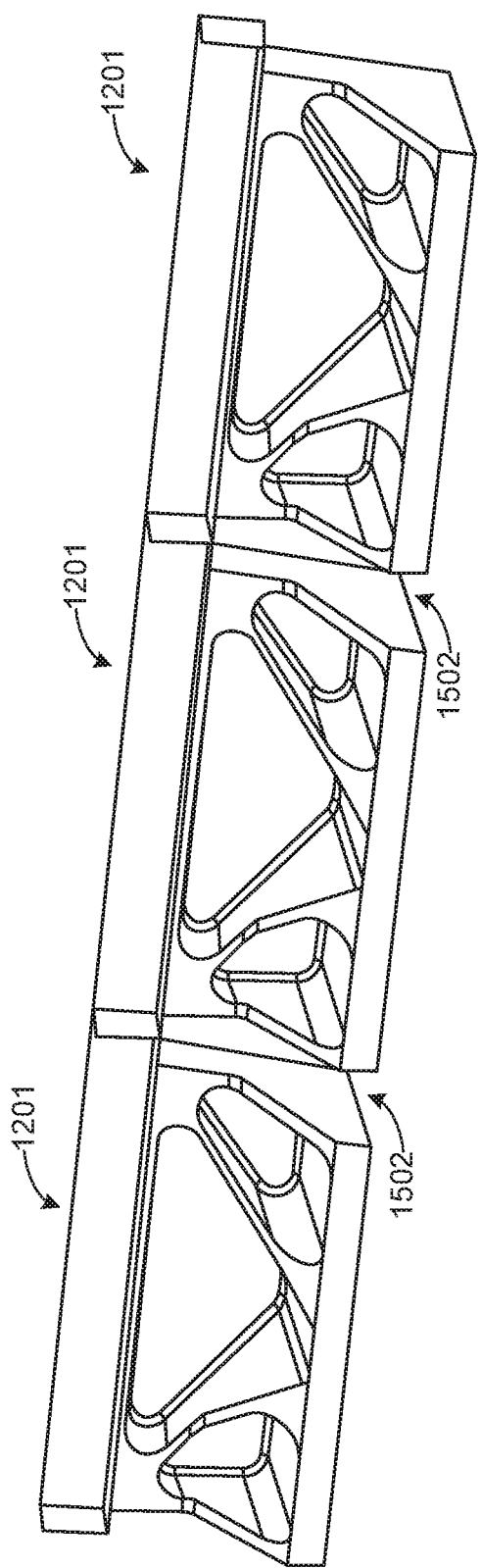
FIG. 15A illustrates an isometric view of example shear ties structured according to FIGS. 12-14 that can be used to implement the example shear ties of FIGS. 2 and/or 3.

FIG. 15A illustrates three of the shear ties 1201 of FIG. 12 being formed of a single piece of material (e.g., a monolithic part) to enable the shear ties 1201 to be coupled together. In this example, the adjacent shear ties 1201 define apertures 1502 through which the stringers 204 extend when the shear tie 1201 is used to couple the rib 202, the stringers 204 and the first panel 106 and/or the second panel 108 together.

Figure 15B:
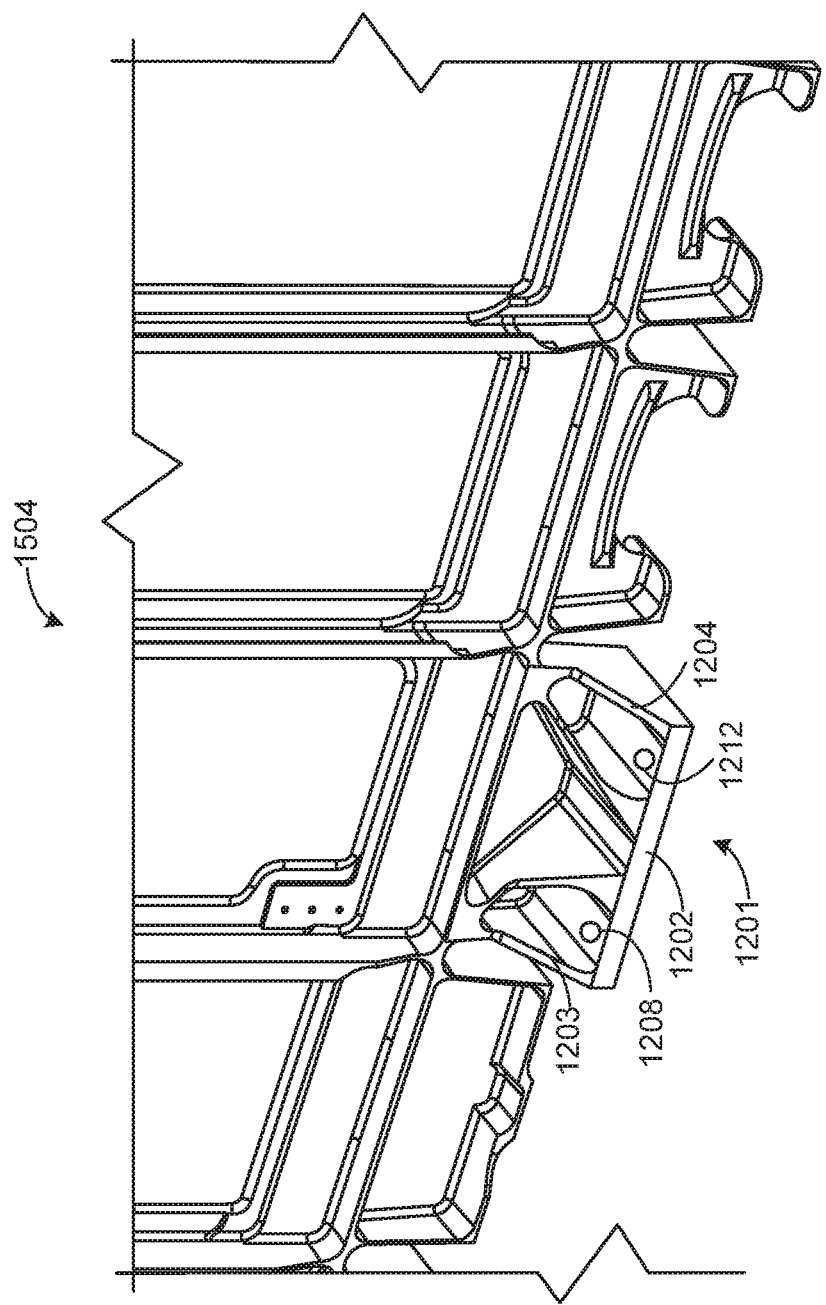

FIGS. 15B and 15C illustrate opposing isometric views of an example rib 1504 that can be used to implement the example rib 202 of FIG. 2 and/or the rib 301 of FIG. 3. In the illustrated examples of FIGS. 15B and 15C, the shear tie 1201 is structured according to the example shear ties 1201 of FIGS. 12-14. While the example rib 202 of FIGS. 15B and 15C include one shear tie structured according to the example shear tie of FIGS. 12-14, the rib 202 of FIGS. 15b and 15C may include any number of such shear ties.

Figure 16:
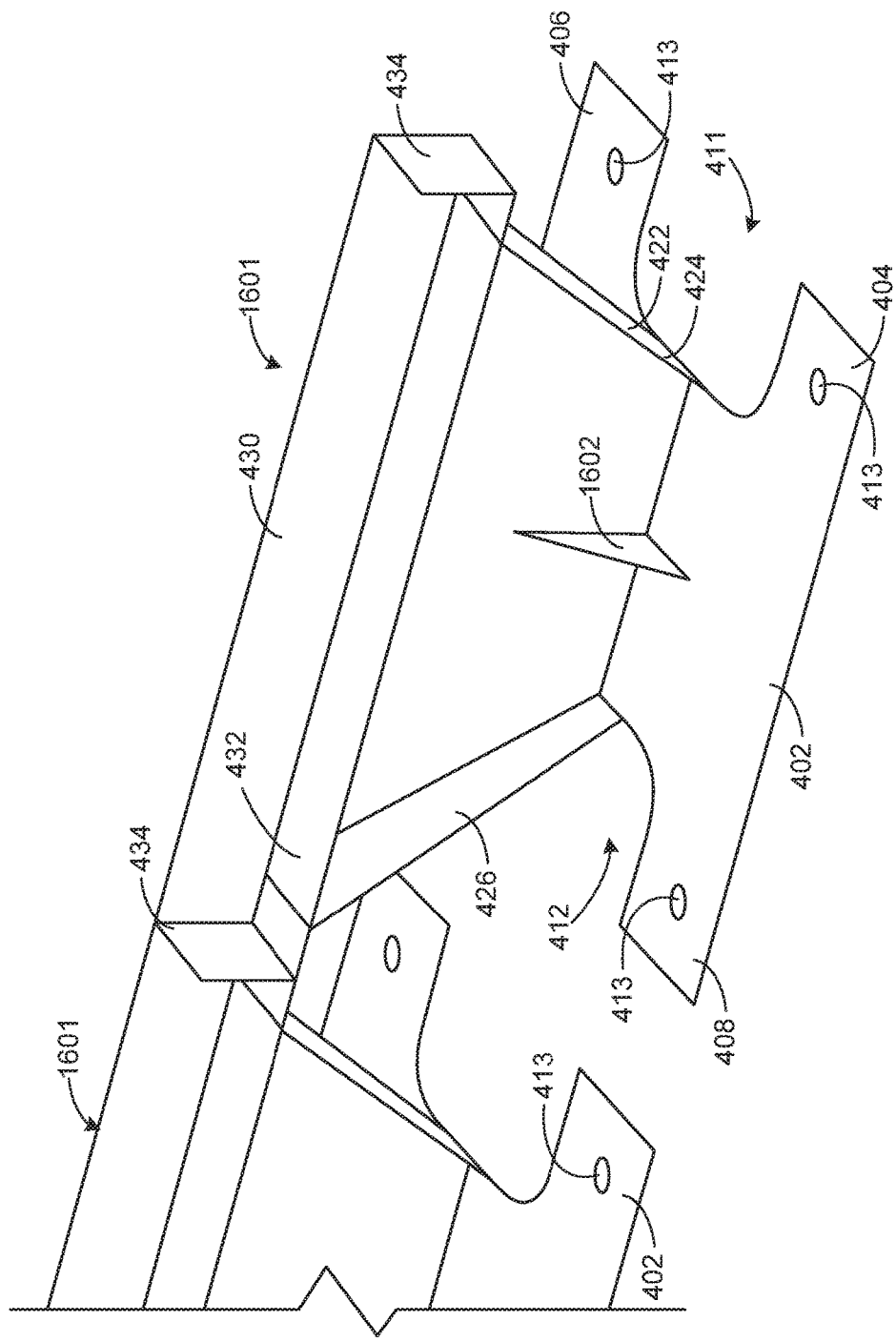
FIG. 16 illustrates an isometric view of an example fourth shear tie that can be used to implement the example shear ties of FIGS. 2 and/or 3.

FIG. 16 illustrates example shear ties 1601 that can be used to implement the shear ties 206 of FIG. 2 and/or the shear ties 305, 306 of FIG. 3. The shear ties 1601 of FIG. 16 are substantially similar to the shear ties 401 of FIG. 7A. However, in contrast to the shear ties 401 of FIG. 7A, the shear ties 1601 of FIG. 16 include a stiffener, protrusion, gusset and/or rib 1602 centrally disposed on the web 420. In some examples, the stiffener 1602 is provided on both sides of the shear tie 1601 where the stiffeners 1602 may be similar and/or different from one another depending on the design specifications. In other examples, the stiffener 1602 is provided on one of the sides of the shear tie 1601 and not on the other of the sides of the shear tie 1601. While one stiffener 1602 is illustrated on the shear tie 1601 of FIG. 16, in other examples, the shear tie 1601 may include additional stiffeners (e.g., 2, 3, etc.). In some such examples, one side of the shear tie 1601 may include a first number (e.g., 1, 2, 3, etc.) of the stiffeners and another side of the shear tie 1601 may include a second number of stiffeners (e.g., 1, 2, 3, etc.) where the first number is different than the second number.

Figure 17:
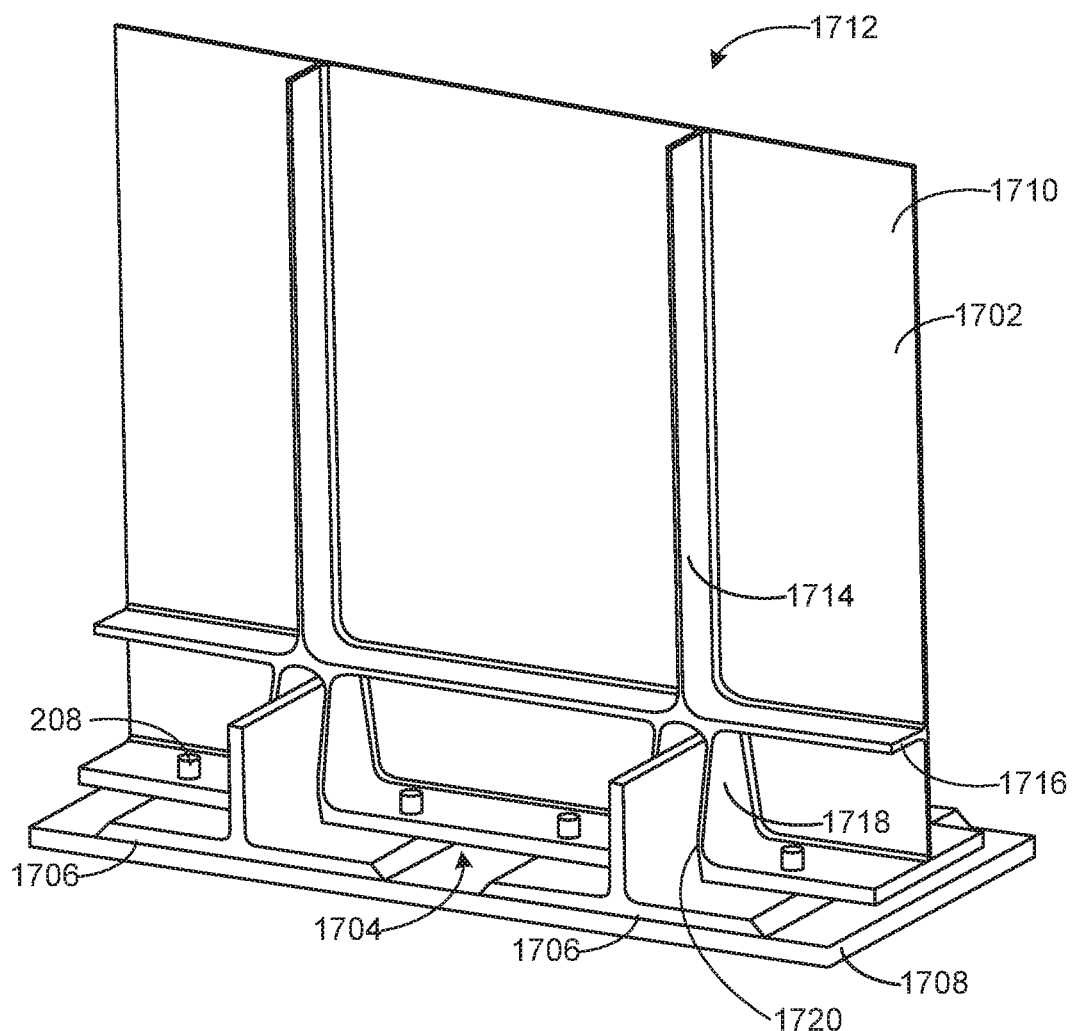
FIG. 17 illustrates an example rib including an example fifth shear tie coupled to an example stringer and an example panel that can be used to implement the example shear ties, ribs, stringers and panels of FIG. 2 and/or the rib of FIG. 3.
Figure 18:
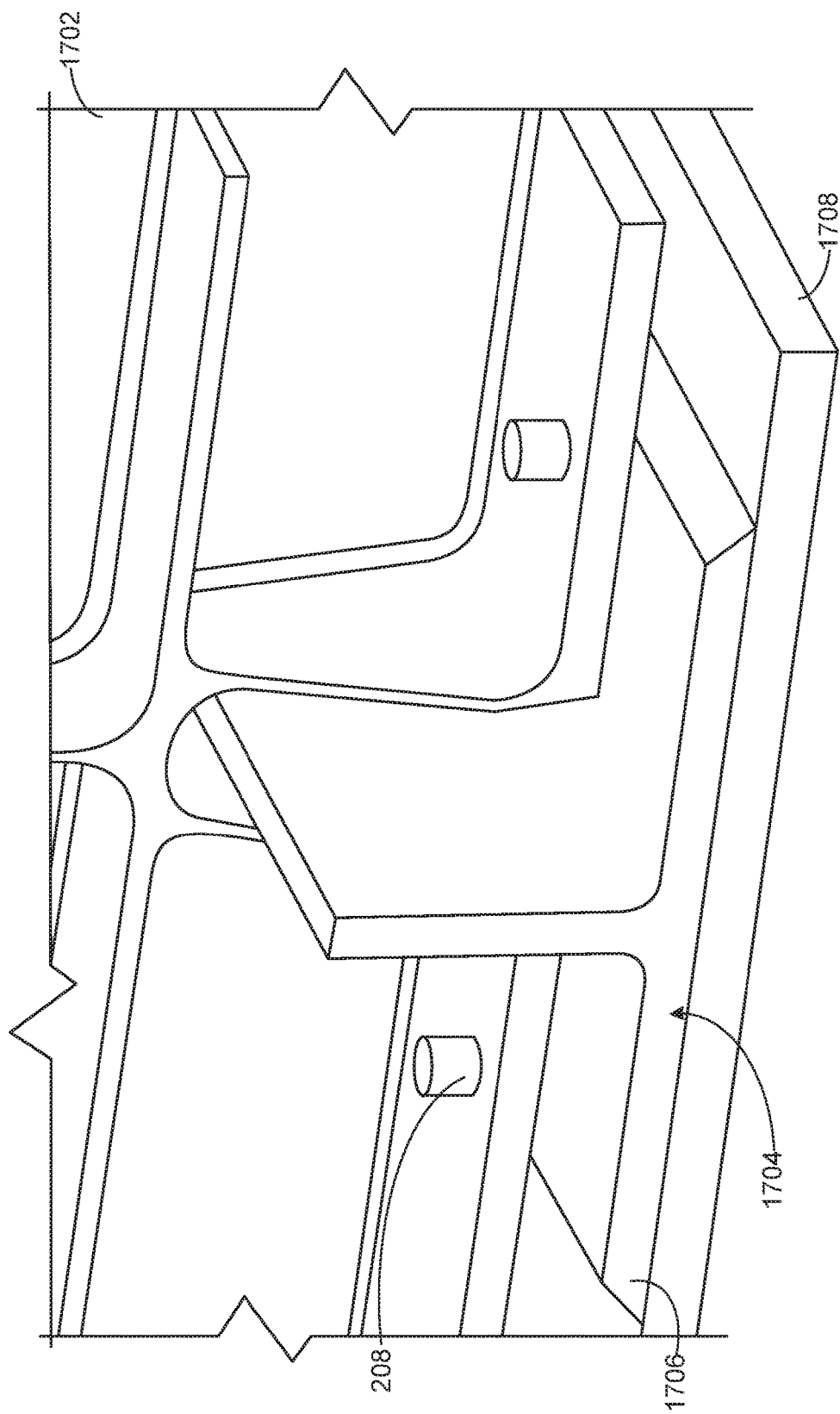
FIG. 18 illustrates a detailed view of the coupling between the example shear tie, the example stringer and the example panel of FIG. 17.
Figure 19:
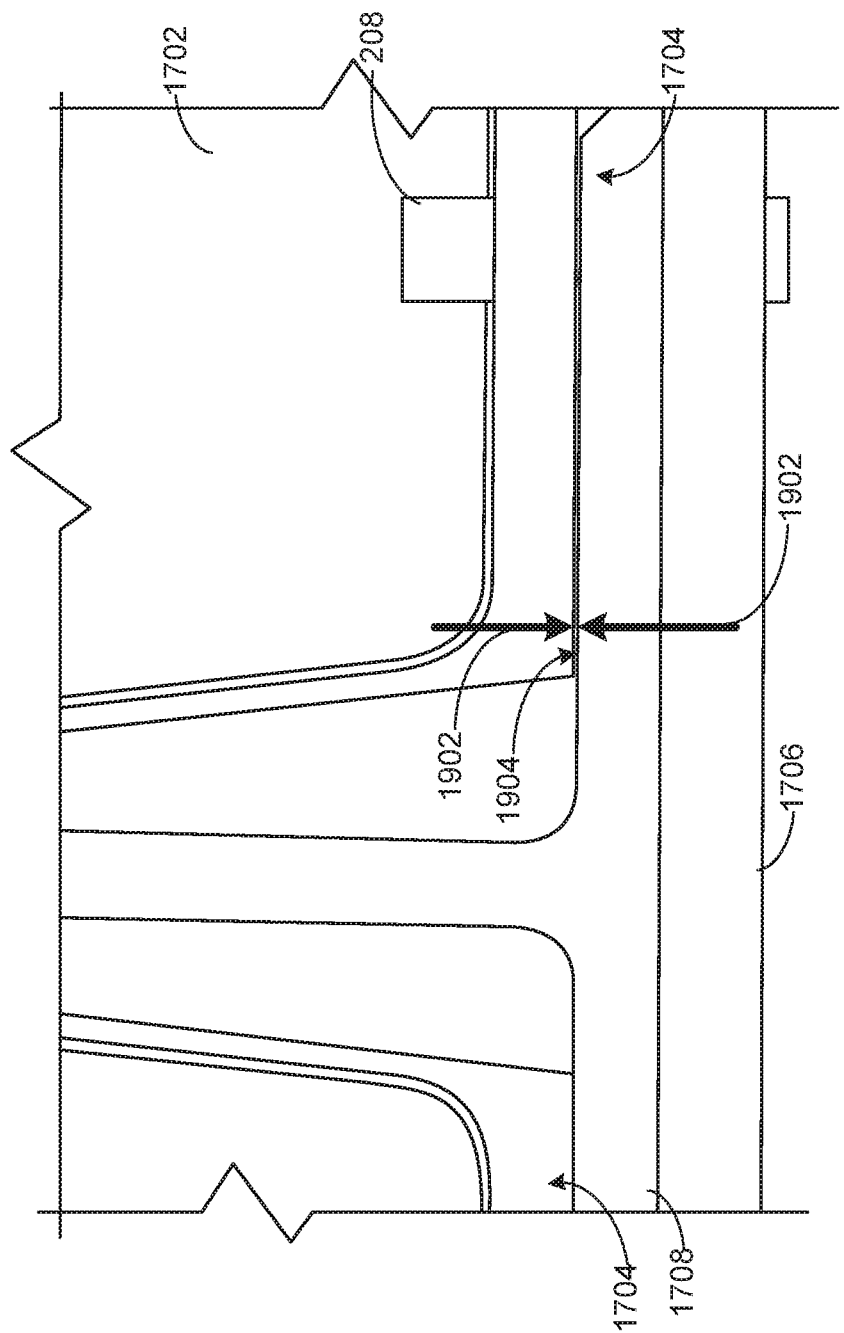
FIG. 19 illustrates a detailed elevation view of the coupling between the example shear tie, the example stringer and the example panel of FIG. 17.

FIGS. 17-19 illustrates different views of an example rib 1702, an example shear tie 1704, example stringers and/or T-shaped stringers 1706 and an example panel 1708 that can be used to implement the rib 202, the shear ties 206, the stringers 204 and the second panel 108 of FIG. 2 and/or the rib 301 of FIG. 3. In this example, the shear tie 1704 is structured and/or configured to enable the pull-up gap between the shear ties 206 and the panel 106 and/or 108 to satisfy a threshold prior to the fastener 208 coupling the shear tie 1704, the stringer 1706 and the panel 1708.

In the illustrated example, the rib 1702 includes a web 1710 disposed in bays 1712 defined by stiffeners 1714, a chord 1716 and the shear tie 1704. In this example, to enable the stringers 1706 to pass through the rib 1702, the shear ties 1704 and/or the rib 1702 include arc-shaped flanges 1718 that define apertures 1720 through which the stringers 1706 extend. In the example of FIG. 17, the stiffeners 1714 intersect the respective arch-shaped flanges 1718 centrally.

FIG. 18 illustrates a detailed view of the rib 1702, the shear tie 1704, the stringer 1706 and the panel 1708 and FIG. 19 illustrates a detailed elevation view of the rib 1702, the shear tie 1704, the stringer 1706 and the panel 1708. Referring to FIG. 19, arrows 1902 are included to show a pull-up gap 1904 between the stringer 1706 and the shear tie 1704. In some examples, the pull-up gap is approximately 0.012 inches and/or 0.016 inches and/or between about 0.008 inches and 0.016 inches prior the fastener 208 coupling the shear tie 1704, the stringer 1706 and the panel 1708.

Figure 20:
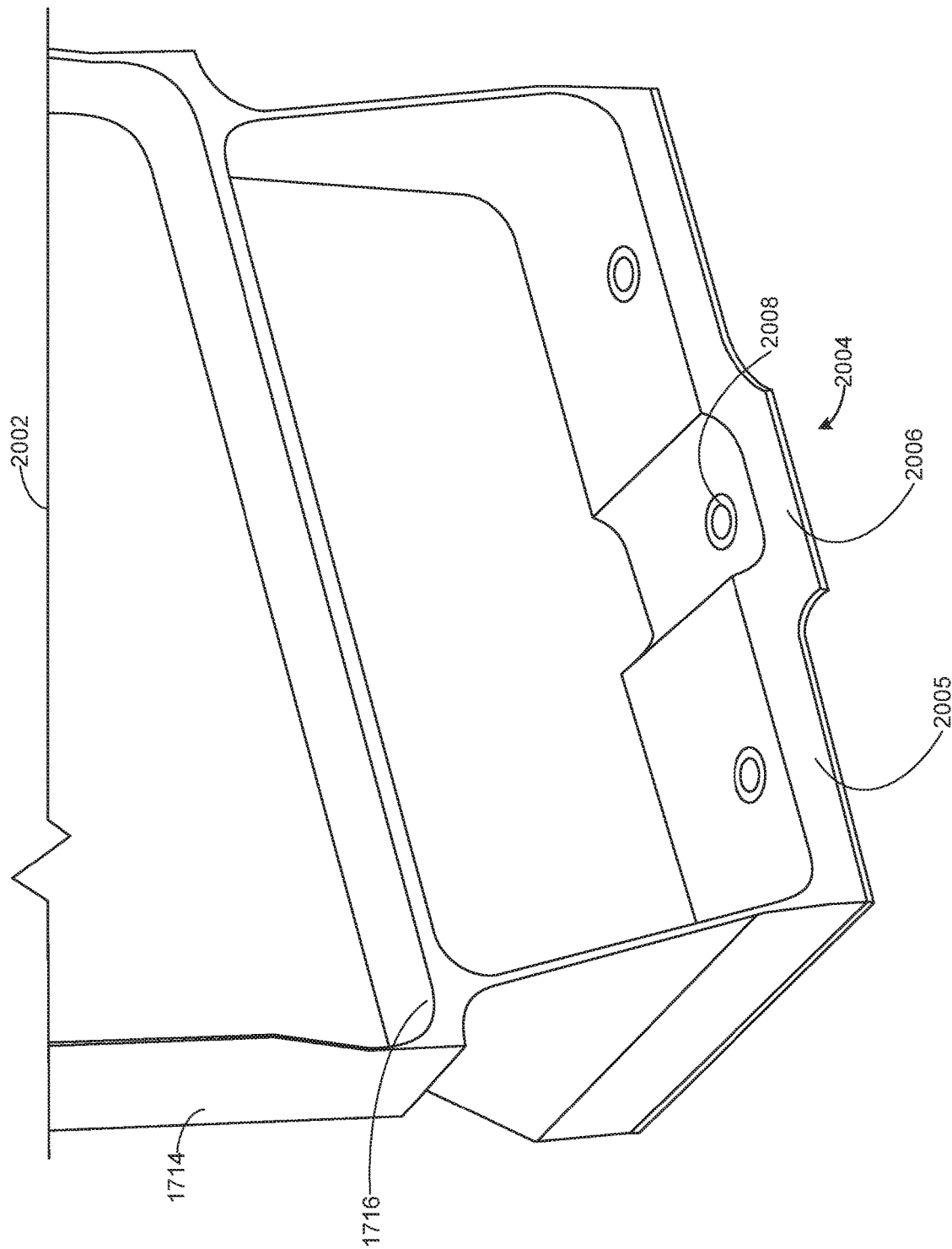
FIG. 20 illustrates an isometric view an example rib including an example fifth shear tie that can be used to implement the example shear ties of FIGS. 2 and/or 3.

FIG. 20 illustrates a portion of an example rib 2002 that can be used to implement the rib 202 of FIG. 2. The rib 2002 of FIG. 20 is similar to the rib 1702 of FIG. 17. However, in contrast to the rib 1702 of FIG. 17, the rib 2002 of FIG. 20 includes an example shear tie 2004 having a cleat 2005 including a central protrusion 2006 through which an aperture 2008 extends. In some examples, the central protrusion 2006 is structured and/or configured to be positioned between the stringers 204 when the shear tie 2004 is used to couple the rib 2002, the stringer 204 and the first and/or second panels 106 and/or 108 together. In such examples, the fastener 208 that extends through the aperture 2008 may not pass through a corresponding aperture of the stringer 1706.

From the foregoing, it will be appreciated that example methods, apparatus and articles of manufacture have been disclosed that relate to example shear ties configured and/or structured to have spring-like properties within the constraints of the static and/or fatigue properties of the material from which the shear ties are made. In some examples, the shear ties are made of aluminum. However, any other material(s) may be used to produce the shear ties. In some examples, the example shear ties enable the pull-up capabilities to be increased between about 80% and 120% relative to some examples. Such an approach of changing the pull-up capabilities (e.g., increasing the pull-up capabilities), enables fewer shims to be used when assembling and/or manufacturing aircraft and/or associated aircraft wings. In some examples, the example shear ties are one-sided shear ties. In some examples, the example shear ties are two-sided shear ties.

In some examples, the ribs may be formed as a one-sided monolithic aluminum machined part including an integral web stiffener, a sculpted flange and a baseline plate sized between about 3-5 inches wide. In some examples, the shear ties are between about 4 inches and 5 inches tall, 7 inches wide and between about 2 inches and 4 inches deep. To enable a fastener(s) that couples the shear tie, the stringer and the wing panel and/or skin to be closer to the web of the shear tie, in some examples, stress peaks may be directed toward the edge of the flange of the shear tie rather than a fillet of the shear tie. To reduce cantilever bending, in some examples, the fastener(s) extending through the shear tie may be spaced from a gusset(s) of the shear tie. In some example, to deter stringer flange edge margins from being affected when the fastener(s) is spaced from the gusset(s) of the shear ties, the gusset(s) may be cut back, removed and/or reduced. In examples in which the example shear ties are one-sided, the shear ties may be coupled to the stringer and the panel and/or skin of the wing using a single row of fasteners. In examples in which the shear ties are two-sided, the shear ties may be coupled to the stringer and the panel and/or the skin of the wing using a double row of fasteners. However, other fastener arrangements may be used for either of the one-sided shear tie or the two-sided shear tie (e.g., a single row of fasteners, off-set placement of fasteners, triangular placement of fasteners, a triple row of fasteners, etc.).

An example apparatus includes a first panel coupled to a second panel to define a wing box; a rib disposed chordwise within the wing box; and a stringer disposed spanwise within the wing box immediately adjacent at least one of the first panel or the second panel, the rib including a shear tie including first and second legs extending in opposite directions, the first and second legs to be coupled to at least one of the first panel, the second panel, or the stringer.

In some examples, the first and second legs enable a pull-up gap to be decreased from a threshold value when a fastener couples the shear tie, the stringer and at least one of the first panel or the second panel. In some examples, the apparatus includes a plurality of stringers and a plurality of ribs, each of the ribs including a plurality of shear ties. In some examples, the shear tie includes a stiffener structured to receive a shear load when the shear tie couples, via a fastener, the rib, the stringer and at least one of the first panel or the second panel. In some examples, the shear tie further includes a web bounded by the stiffener to form a V-shaped web. In some examples, the shear tie further includes a chord and a cleat, the stiffener positioned between the chord and the cleat. In some examples, the first and second legs extend in opposite directions from the stiffener, the first and second legs structured to enable the pull-up gap to satisfy a threshold value when a fastener couples the shear tie, the stringer and at least one of the first panel or the second panel.

In some examples, the first leg includes a first sub-leg and a second sub-leg and the second leg include a third sub-leg and a fourth sub-leg, the first sub-leg spaced from the second sub-leg to increase a flexibility of the first sub-leg and the second sub-leg, the third sub-leg spaced from the fourth sub-leg to increase a flexibility of the third sub-leg and the fourth sub-leg. In some examples, the fastener is a first fastener, the first leg defines a first aperture to receive the first fastener to couple the rib, the stringer and at least one of the first panel or the second panel, the second leg defines a second aperture to receive a second fastener to couple the rib, the stringer and at least one of the first panel or the second panel. In some examples, the first leg includes first apertures, the second leg includes second apertures, the first and second apertures being symmetric about at least one of a longitudinal axis of the shear tie or a transverse axis of the shear tie.

An example apparatus includes a first panel coupled to a second panel to define a wing box; a rib disposed chordwise within the wing box; and a stringer disposed spanwise within the wing box immediately adjacent at least one of the first panel or the second panel, the rib including means for enabling a pull-up gap to satisfy a threshold value greater than 0.008 inches prior to a fastener coupling the rib, the stringer and at least one of the first panel or the second panel, the pull-up gap being defined between the rib and at least one of the stringer, the first panel, or the second panel. In some examples, the means for enabling the pull-up gap to satisfy the threshold value includes flexible legs of a shear tie. In some examples, the means for enabling the pull-up gap to satisfy the threshold value includes a shear tie including a stiffener structured to receive a shear load when the fastener extends through the shear tie to couple the rib, the stringer and at least one of the first panel or the second panel. In some examples, the shear tie further includes a web bounded by the stiffener to form a V-shaped web. In some examples, the shear tie further includes a chord and a cleat, the stiffener positioned between the chord and the cleat. In some examples, the cleat includes a first leg and a second leg, the first and second legs extending in opposite directions from the stiffener, the first and second legs structured to enable the pull-up gap to satisfy the threshold value. In some examples, the fastener includes a plurality of fasteners and the shear tie further includes a first flange and a second flange, the first flange, the cleat, and the stiffener defining a first fitting, the second flange, the cleat, and the stiffener defining a second fitting, a first aperture being defined by the cleat at the first fitting and a second aperture being defined by the cleat at the second fitting, the first and second apertures to receive the respective fasteners to couple the rib, the stringer and at least one of the first panel or the second panel. In some examples, the cleat includes a first leg and a second leg extending in a first direction, the first leg spaced from the second leg to increase a flexibility of the first leg and the second leg. In some examples, the apparatus includes a gusset coupled between the web and the cleat.

An example method includes positioning a rib chordwise adjacent a first panel of a wing; positioning a stringer spanwise overtop of the rib and between the first panel and the rib, a pull-up gap being defined between a shear tie of the rib and at least one of the stringer or the first panel, the pull-up gap being greater than 0.008 inches; and coupling the shear tie, the stringer, and the first panel using a fastener to decrease the pull-up gap.

An apparatus including a rib including a shear tie including first and second legs extending in opposite directions, the rib to be disposed within a wingbox of an aircraft wing defined by first and second panels, the first and second legs of the shear tie to be coupled to at least one of the first panel or the second panel.

In some examples, the shear tie includes a stiffener structured to receive a shear load when the shear tie couples, via a fastener, the rib, a stringer and at least one of the first panel or the second panel. In some examples, the shear tie further includes a web bounded by the stiffener to form a V-shaped web. In some examples, the shear tie further includes a chord and a cleat, the stiffener positioned between the chord and the cleat. In some examples, the first leg includes a first sub-leg and a second sub-leg and the second leg include a third sub-leg and a fourth sub-leg, the first sub-leg spaced from the second sub-leg to increase a flexibility of the first sub-leg and the second sub-leg, the third sub-leg spaced from the fourth sub-leg to increase a flexibility of the third sub-leg and the fourth sub-leg.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft wing comprising:
   a first panel and a second panel defining a wing box; and
   a rib extending chordwise between the first and second panels and coupled to the first and second panels, the rib including:
      a first web; and
      a shear tie including:
         a second web extending from the first web, the second web having a first edge, a second edge opposite the first edge, and a third edge between the first and second edges;
         a first flange extending from the first edge of the second web;
         a second flange extending from the second edge of the second web;
         a cleat extending from the third edge of the second web, the cleat coupled to the first panel; and
         a V-shaped stiffener having a first portion extending between a central portion of the cleat and the first flange near an intersection of the first web and the second web, and a second portion extending between the central portion of the cleat and the second flange near the intersection of the first web and the second web.

2. The aircraft wing of claim 1, wherein:
   the first flange extends from the first edge of the second web in a substantially perpendicular direction relative to the second web, the second flange extends from the second edge of the second web in a substantially perpendicular direction relative to the second web, the second flange substantially parallel to the first flange, and the cleat extends from the third edge of the second web in a substantially perpendicular direction relative to the second web.

3. The aircraft wing of claim 1, wherein the cleat includes an opening, further including a fastener extending through the opening to couple the cleat to the first panel.

4. The aircraft wing of claim 3, further including a stringer disposed along the first panel, the stringer at least partially disposed between the cleat and the first panel, the fastener extending through the stringer.

5. The aircraft wing of claim 1, wherein the shear tie is a first shear tie, the rib including a second shear tie disposed adjacent the first shear tie, the second shear tie spaced apart from the first shear tie such that a gap is formed between the first and second shear ties.

6. The aircraft wing of claim 5, further including a stringer extending along the first panel, the stringer having a T-shaped cross-section with a first wall and a second wall substantially perpendicular to the first wall, wherein the first wall of the stringer extends through the gap between the first and second shear ties.

7. The aircraft wing of claim 6, wherein a first portion of the second wall of the stringer is disposed between the cleat of the first shear tie and the first panel, and a second portion of the second wall of the stringer is disposed between a cleat of the second shear tie and the first panel.

8. The aircraft wing of claim 1, wherein the first flange is tapered from a distal end of the first flange toward an end of the first flange adjacent the first web, and the second flange is tapered from a distal end of the second flange to an end of the second flange adjacent the second web.

9. The aircraft wing of claim 1, wherein the first flange, the second flange, and the cleat extend in opposite directions from the second web.

10. The aircraft wing of claim 1, wherein the V-shaped stiffener extends from the second web in a substantially perpendicular direction.

11. The aircraft wing of claim 1, wherein a first fitting is defined between the cleat, the first flange, and the first portion of the V-shaped stiffener, and wherein a second fitting is defined between the cleat, the second flange, and the second portion of the V-shaped stiffener.

12. The aircraft wing of claim 11, wherein the cleat includes a first opening in the first fitting to receive a first fastener and a second opening in the second fitting to receive a second fastener.

13. The aircraft wing of claim 1, further including a first stringer extending along the first panel and a second stringer extending along the first panel, wherein a portion of the first stringer is disposed between the cleat and the first panel and a portion of the second stringer is disposed between the cleat and the first panel.

14. The aircraft wing of claim 1, wherein the first flange, the first portion of the V-shaped stiffener, and a first portion of the cleat form a first triangular opening, and the second flange, the second portion of the V-shaped stiffener, and a second portion of the cleat form a second triangular opening.

15. An aircraft wing comprising:
a first panel and a second panel defining a wing box; and
a rib extending chordwise between the first and second panels and coupled to the first and second panels, the rib including:
a first web; and
a shear tie including:
a second web extending from the first web, the second web having a first side, a second side opposite the first side, a first edge, a second edge opposite the first edge, and a third edge between the first and second edges;
a first flange coupled to the first edge of the second web and extending outward from the first side and the second side of the second web;
a second flange coupled to the second edge of the second web and extending outward from the first side and the second side of the second web, the second flange spaced apart from the first flange, the second flange substantially parallel to the first flange;
a cleat coupled to the third edge of the second web and extending outward from the first side and the second side of the second web, the cleat extending between a first distal end of the first flange and a second distal end of the second flange, the cleat coupled to the first panel; and
a V-shaped stiffener having a first portion extending between a central portion of the cleat and the first flange near an intersection of the first web and the second web, and a second portion extending between the central portion of the cleat and the second flange near the intersection of the first web and the second web.

16. The aircraft wing of claim 15, wherein the cleat is substantially perpendicular to the first and second flanges.

17. The aircraft wing of claim 15, wherein the first flange, the first portion of the V-shaped stiffener, and a first portion of the cleat form a first triangular opening, and the second flange, the second portion of the V-shaped stiffener, and a second portion of the cleat form a second triangular opening.

18. A method of assembling a wing of an aircraft, the method comprising:
positioning a stringer spanwise along a panel;
positioning a rib chordwise adjacent the panel such that the stringer is at least partially disposed between the rib and the panel, the rib including:
a first web; and
a shear tie including:
a second web extending from the first web, the second web having a first edge, a second edge opposite the first edge, and a third edge between the first and second edges;
a first flange extending from the first edge of the second web in a perpendicular direction to the second web, the first flange being tapered in the perpendicular direction from a distal end of the first flange toward an end of the first flange adjacent the first web;
a second flange extending from the second edge of the second web in the perpendicular direction to the second web, the second flange substantially parallel to the first flange, the second flange being tapered in the perpendicular direction from a distal end of the second flange toward an end of the second flange adjacent the second web;
a cleat extending from the third edge of the second web, the cleat coupled to the panel; and
a V-shaped stiffener having a first portion extending between a central portion of the cleat and the first flange near an intersection of the first web and the second web, and a second portion extending between the central portion of the cleat and the second flange near the intersection of the first web and the second web; and coupling the shear tie, the stringer, and the panel using a fastener.

19. The method of claim 18, wherein the fastener extends through the cleat of the shear tie, the stringer, and the panel.

20. The method of claim 18, wherein the stringer is a first stringer and the fastener is a first fastener, further including:

positioning a second stringer spanwise along the panel such that the second stringer is at least partially disposed between the rib and the panel; and coupling the shear tie, the second stringer, and the panel using a second fastener.

* * * * *